US010549173B2

(12) United States Patent
Blahnik

(10) Patent No.: US 10,549,173 B2
(45) Date of Patent: Feb. 4, 2020

(54) SHARING UPDATABLE GRAPHICAL USER INTERFACE ELEMENTS

(71) Applicant: Apple Inc., Cupertino, CA (US)

(72) Inventor: Jay C. Blahnik, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 15/082,943

(22) Filed: Mar. 28, 2016

(65) Prior Publication Data

US 2017/0274267 A1   Sep. 28, 2017

(51) Int. Cl.
| *A63B 71/06* | (2006.01) |
| *G06F 3/0482* | (2013.01) |
| *G06F 3/0484* | (2013.01) |
| *A63B 24/00* | (2006.01) |
| *G09B 19/00* | (2006.01) |
| *H04L 29/08* | (2006.01) |

(52) U.S. Cl.
CPC ...... *A63B 71/0622* (2013.01); *A63B 24/0062* (2013.01); *A63B 24/0084* (2013.01); *G06F 3/0482* (2013.01); *G06F 3/0484* (2013.01); *G09B 19/0038* (2013.01); *A63B 2071/0663* (2013.01); *A63B 2220/17* (2013.01); *A63B 2220/20* (2013.01); *A63B 2220/62* (2013.01); *A63B 2230/75* (2013.01); *H04L 67/10* (2013.01)

(58) Field of Classification Search
CPC ............................ H04L 63/08; H04L 67/1068
See application file for complete search history.

(56) References Cited

U.S. PATENT DOCUMENTS

| 6,888,927 | B1 * | 5/2005 | Cruickshank | ......... | H04M 3/537 |
| | | | | | 379/142.06 |
| 7,274,375 | B1 * | 9/2007 | David | ................ | G06Q 10/06 |
| | | | | | 345/619 |
| 8,929,522 | B2 * | 1/2015 | Berk | ................ | G06Q 30/0241 |
| | | | | | 379/90.01 |
| 2005/0210409 | A1 * | 9/2005 | Jou | .................. | G06Q 10/00 |
| | | | | | 715/811 |
| 2007/0197157 | A1 * | 8/2007 | Bellinger | .......... | F02B 29/0418 |
| | | | | | 454/155 |

(Continued)

FOREIGN PATENT DOCUMENTS

WO          2015/094220 A1       6/2015

OTHER PUBLICATIONS

The International Search Report and the Written Opinion of the International Searching Authority dated Mar. 21, 2017 in International Application No. PCT/US2017/016774.

(Continued)

*Primary Examiner* — Li P Sun
*Assistant Examiner* — Qi Wan
(74) *Attorney, Agent, or Firm* — Kilpatrick Townsend & Stockton

(57) ABSTRACT

User interface elements relating to fitness may be shared between user devices. These user interface elements may be updated based at least in part on activity data of users associated with the user devices. A user may determine a length of time for sharing their user interface elements. Once a sharing relationship between at least two users has been established, updates corresponding to user interface elements may be shared between the users via their respective user devices.

15 Claims, 11 Drawing Sheets

(56) References Cited

U.S. PATENT DOCUMENTS

| | | | |
|---|---|---|---|
| 2010/0106730 A1* | 4/2010 | Aminian | G06Q 10/10 707/748 |
| 2011/0078184 A1* | 3/2011 | Song | G06Q 10/107 707/770 |
| 2012/0150327 A1* | 6/2012 | Altman | G06F 19/3418 700/91 |
| 2013/0254413 A1* | 9/2013 | Steele | H04L 67/1068 709/228 |
| 2013/0290820 A1* | 10/2013 | Dhanani | G06Q 50/01 715/205 |
| 2013/0297696 A1* | 11/2013 | Alexandrov | H04L 65/403 709/204 |
| 2014/0004492 A1* | 1/2014 | O'Reilly | G06F 19/3456 434/236 |
| 2014/0068401 A1* | 3/2014 | Kirigin | G06F 17/30884 715/205 |
| 2015/0009152 A1* | 1/2015 | Tang | G09G 5/12 345/173 |
| 2015/0163210 A1 | 6/2015 | Meyers | |

OTHER PUBLICATIONS

Office Action dated Mar. 19, 2019 in European Patent Application No. 17 706 061.3-1222. 15 pages.

First Examination Report dated Jul. 29, 2019 in Australian Patent Application No. 2017240907. 3 pages.

* cited by examiner

SHARING UPDATABLE GRAPHICAL USER INTERFACE ELEMENTS

BACKGROUND

People are becoming more and more aware of the importance of regular exercise for maintaining one's health. Additionally, a variety of electronic devices are now available for tracking a person's physical activity throughout the day. Such tracking, in conjunction with goal setting, can help the person become personally accountable for their own physical well-being. For some people, however, the accountability that comes from simply tracking one's own activity may be insufficient motivation for sustained regular exercise.

BRIEF SUMMARY

Embodiments of the present disclosure can provide systems, methods, and computer-readable medium for sharing updatable graphical fitness user interface elements. According to one embodiment, a method may be implemented by a computer system to at least receive, at a first user device, a first communication from a second user device. The first communication may include a request to share an updatable graphical fitness user interface element. In response to receiving the first communication, the method may also cause the computer system to receive input, at the first user device, that accepts the request to share the updatable graphical fitness user interface element. The input may indicate acceptance of the request to share the updatable graphical fitness user interface element according to a first condition, according to a second condition, or according to a third condition.

In some examples, accepting the request to share the updatable graphical fitness user interface element according to the first condition may include accepting the request to share the updatable graphical fitness user interface element for a predetermined period of time. In some examples, accepting the request to share the updatable graphical fitness user interface element according to a second condition may include accepting the request to share the updatable graphical fitness user interface element for an indefinite period of time. In some examples, accepting the request to share the updatable graphical fitness user interface element according to a third condition may include accepting the request to share the updatable graphical fitness user interface element for a user-specified period of time. The updatable graphical fitness user interface element may include a plurality of concentric rings that may be updated based on one or more activities performed by a user associated with the second device. The method may also cause the computer system to display, after receiving the input, the updatable graphical fitness user interface element. In some examples, the request to share the updatable graphical fitness user interface element may include an offer to share the updatable graphical fitness user interface element of the second device with the first device. In some examples, the request to share the updatable graphical fitness user interface element may include a request, from the second device, for the updatable graphical fitness user interface element of the first device.

According to one embodiment, a method may be implemented by a computer system to at least receive, at a first device, a first communication from a second device that includes a first offer to share a first updatable graphical fitness user interface element. The method may also cause the computer system to, in response to receiving the first communication, receive input, at the first device, corresponding to the first offer to share the updatable graphical fitness user interface element. The input may include acceptance of the first offer to share the first updatable graphical fitness user interface element by sending, to the second device, a second offer to share a second updatable graphical fitness user interface element for a period of time, acceptance of the first offer to share the first updatable graphical fitness user interface element by sending an acceptance acknowledgement, or rejection of the first offer to share the first updatable graphical fitness user interface element by sending a rejection acknowledgement.

In some examples, the method may also cause the computer system to, after sending the second offer to share the second updatable graphical fitness user interface element, transmit the second updatable graphical fitness user interface element to the second device. In some examples, the period of time for which the second updatable graphical fitness user interface element may be shared may be a predetermined period of time, an indefinite period of time, or a user-specified period of time. In some examples, the method may also cause the computer system to, when the input indicates acceptance of the first offer, display a first version of the first updatable graphical fitness user interface element at a first time, and display a second version of the first updatable graphical fitness user interface element at a second time. The second version may be updated based at least in part on physical activities of a user associated with the second device. In some examples, at least a portion of the physical activities may be performed by the user between the first time and the second time.

In some examples, the method may also cause the computer system to display, at the first device, the first updatable graphical fitness user interface element and a first user identifier associated with a first user of the second device when the input indicates acceptance of the offer to share the first updatable graphical fitness user interface element. In some examples, the method may also cause the computer system to display, at the first device, a third updatable graphical fitness user interface element and a second user identifier associated with a second user of a third device together with the first updatable graphical fitness user interface element and the first user identifier. The third updatable graphical fitness user interface element may be associated with the third device. In some examples, displaying the third updatable graphical fitness user interface element together with the first updatable graphical fitness user interface element may include displaying the third updatable graphical fitness user interface element together with the first updatable graphical fitness user interface element in a list ranked according to a ranking dimension. The ranking dimension may be an alphabetical dimension or an activity dimension. In some examples, the first user identifier may include a first user name of the first user. In some examples, displaying the first updatable graphical fitness user interface element and the first user identifier may include displaying the first updatable graphical fitness user interface element, the first user name, and a first user image associated with the first user.

In some examples, the method may also cause the computer system to receive second input, at the first device, that selects at least one of the first user identifier or the first updatable graphical fitness user interface element. The method may also cause the computer system to, in response to receiving the second input at the first device, display, at the first device, a detailed activity view corresponding to the first updatable graphical fitness user interface element. In some examples, the method may also cause the computer system to, after displaying the detailed activity view corresponding to the first updatable graphical fitness user interface element, receive third input, at the first device, that causes the first device to display one or more options. The one or more option may send a message to the second device, send the second updatable graphical fitness user interface element to the second device, send location information to the second device indicating a location of the first device, or send a communication indicating revocation of acceptance of the offer to share the first updatable graphical fitness user interface element. The message to the second device may include at least one of a predetermined textual message, a fitness emoji, or a predetermined audio message.

According to one embodiment, a method may be implemented by a computer system to display, at a first user device and based at least in part on a contact list associated with the first user device, a set of users. In some examples, each user of the set of users may be associated with a user device capable of receiving an updatable graphical fitness user interface element. The method also causes the computer system to receive an input, at the first user device, indicating selection of a first user from the set of users. The method may also cause the computer system to, in response to receiving the input at the first user device, provide an offer to a second user device to share a first updatable graphical fitness user interface element associated with the first user device. In some examples, the second user device may correspond to the first user.

In some examples, the method may also cause the computer system to receive, at the first user device, a communication from the second user device indicating acceptance of the offer to share the first updatable graphical fitness user interface element. In some examples, the second user device may be enabled to generate the communication in response to a second input received at the second user device that indicates acceptance of the offer to share the first updatable graphical fitness user interface element. The second input may include accepting the offer to share the updatable graphical fitness user interface element according to a first condition or accepting the request to share the updatable graphical fitness user interface element according to a second condition. The method may also cause the computer system to, after receiving the communication, display, at the first user device, a user identifier of the first user in a set of activity friends. In some examples, each activity friend of the set of activity friends may have previously accepted an offer from the first user device to share the first updatable graphical fitness user interface element or offered to share a respective updatable graphical fitness user interface element with the first user device that has also been accepted by the first user device.

The method may also cause the computer system to receive second input, at the first device, that indicates selection of the first user from the set of activity friends. The method may also cause the computer system to, in response to receiving the second input at the first user device, send a communication to the second user device that indicates termination of sharing of the first updatable graphical fitness user interface element with the second device.

DETAILED DESCRIPTION OF THE INVENTION

Figure 1:
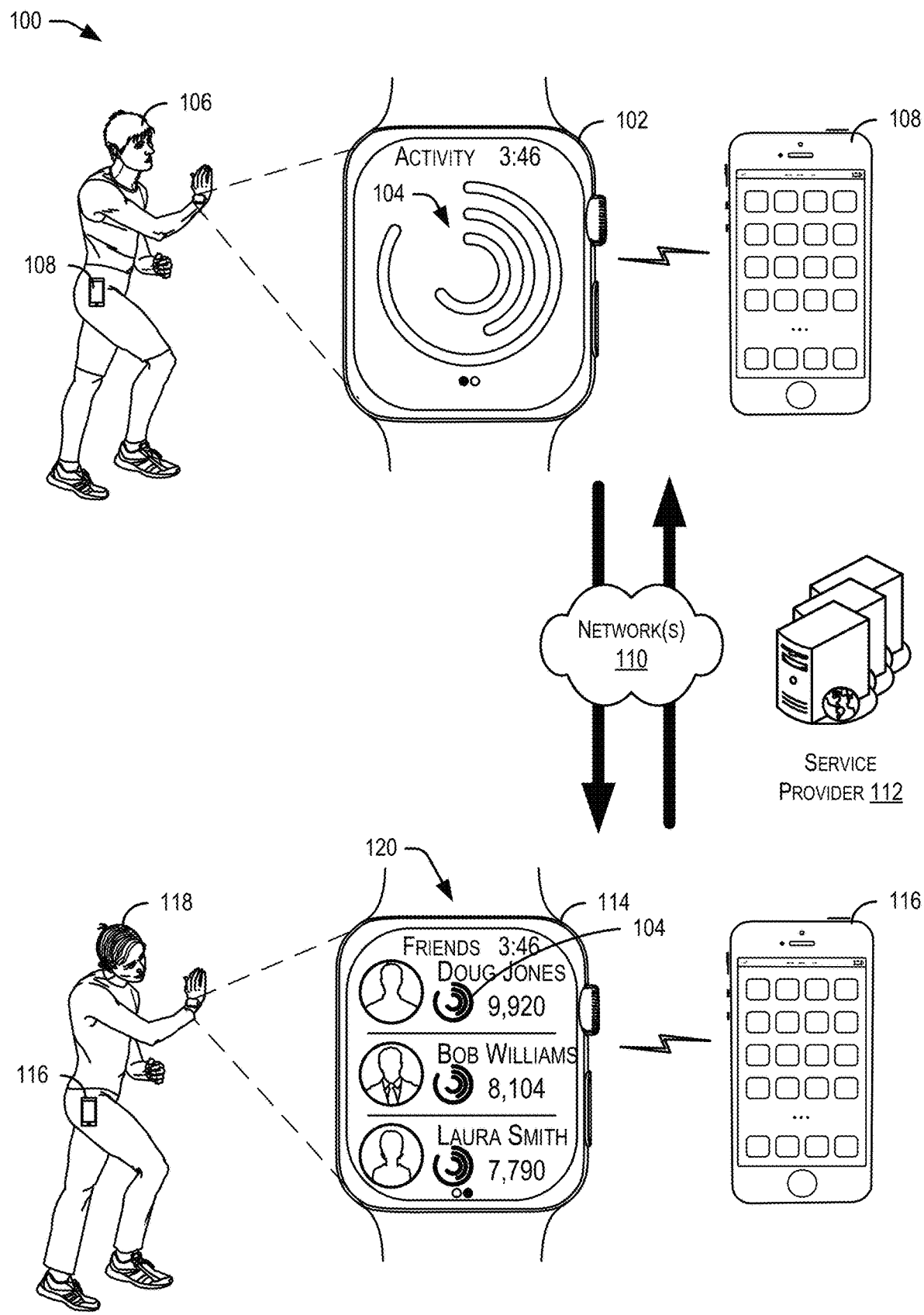
FIG. 1 illustrates a simplified block diagram illustrating an example flow for sharing updatable graphical fitness user interface elements as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, sharing updatable graphical fitness user interface elements among user devices and enabling communication relating to the updatable graphical fitness user interface elements between the user devices. In particular, initial offers to share updatable graphical user interface elements may be initiated by users and provided to other users. Once received by these other users at their user devices, the other users may indicate whether to accept the initial offers to share and/or whether to extend similar offers to share their own updatable graphical fitness user interface elements. In some examples, acceptance of the initial offers to share by the other users results in the other users automatically sharing their own updatable graphical fitness user interface elements with the original users. In this manner, a two-way sharing relationship is created between the other users and the original users based on acceptance of the initial offers. The initial offers and any later offers may each be associated with a predetermined or user-configurable time period in which the corresponding updatable graphical fitness user interface elements will be shared (e.g., one day, one week, a specific date, or an indefinite date). Once a sharing relationship has been established between two user devices (e.g., at least one user accepts an offer to share), a communication channel between the two user devices may be established. The length of the communication channel may correspond to the appropriate time period. Via the communication channel, certain activity data may be shared between the two user devices (e.g., via a service provider computer that receives activity data, stores activity data, and shares activity data). For example, activity data relating to the shared updatable graphical fitness user interface elements may be shared. Once such activity data has been received by the user devices, updated versions of the updatable graphical fitness user interface elements may be displayed by the user devices. In some examples, the receiving user devices generate the updates to the updatable graphical fitness user interface elements. In other examples, the updates are generated by other devices (e.g., the service provider computer), and provided to the receiving user devices for display. Using their respective devices, the original users and the other users can decide whether to "hide" from each other, while still keeping the sharing relationship intact. For example, hiding can include a first user hiding a second user such that the second user's activity data is not presented at the first user's device. Hiding can also include the first user hiding from the second user such that the first user's activity data is not presented at the second user's device. In this manner, each user can decide whether to hide other users or to hide from other users.

The activity data may be provided automatically in response to certain activity events. For example, after a user devices identifies that a user of the user device has completed a workout, accomplished a goal corresponding to an aspect of the updatable graphical fitness user interface element (e.g., a movement goal, an exercise goal, or a stand goal), or otherwise, the activity data may be provided to the other device(s). Activity data may also be provided automatically in accordance with an interval. For example, regardless of whether or not the user device has identified any activity-related events, activity data may be provided every fifteen minutes during daytime hours and every hour during nighttime hours. Activity data may also be provided in response to user input. For example, when a user opens an application in which the updatable graphical fitness user interface elements are displayed, uses the application to send their own updated activity data, uses the user devices to check in to a certain geographic locations (e.g., a gym), or otherwise, updated activity data may be provided. For the receiving user, seeing updates to the other user's updatable graphical fitness user interface element may provide additional motivation to engage in physical activity. Likewise, for the sharing user, knowing that their updatable graphical fitness user interface element is being shared with the receiving user may provide additional motivation to engage in physical activity. In this manner, the sharing of updatable graphical fitness user interface elements may increase overall physical activity by making users not only accountable to themselves, but also accountable to others.

In one example, a first user may be associated with a first wearable device (e.g., a data collection device) that tracks certain physical activities of the first user. The tracked physical activities may be organized into an updatable graphical fitness user interface element. The updatable graphical fitness user interface element may update as the first user engages in additional physical activities throughout the day. Using techniques described herein, the first user may identify a second user who is associated with a second wearable device that has similar functionality as the first wearable device (e.g., maintains an updatable graphical fitness user interface element). The first user may cause an offer to share their updatable graphical fitness user interface element to be sent to the second wearable device and/or a second user device associated with the second user (e.g., a mobile phone paired with the second wearable device). If the second user accepts the offer, the second user may receive the first user's updatable graphical fitness user interface element, which may be periodically updated, at the second wearable device, as the first user engages in physical activities (e.g., throughout the day or other period). In this manner, the second user may be informed of the first user's physical activity. As part of accepting the offer from the first user or otherwise, the second user may cause an offer to share their updatable graphical fitness user interface element to be sent to the first wearable device and/or a first user device associated with the first user (e.g., a mobile phone paired with the first wearable device). If accepted, the first user may receive the second user's updatable graphical fitness user interface element, including periodic updates. The first user's offer and/or the second user's offer may include certain conditions. For example, an example condition may indicate a time period in which the updatable graphical fitness user interface element will be shared. Other conditions may indicate a threshold amount of information received from the other user, a threshold amount of activity reached by either user, and/or a threshold amount of data used by devices of the receiving user.

While the techniques described herein refer to sharing updatable graphical fitness user interface elements, it is understood that such techniques are also applicable to sharing activity data, instead of or in addition to sharing updatable graphical fitness user interface elements. In some examples, the activity data can include data collected by wearable devices, which may be processed by the wearable devices prior to sharing, or may be shared in their raw formats. In addition, while the techniques described herein refer to data collection via wearable devices that include displays, it is understood that such techniques are also applicable to data collection devices that are neither wearable nor include displays.

FIG. 1 illustrates a simplified flow diagram 100 depicting a wearable device 102 configured with an interface on which may be presented any suitable information. For example, as illustrated in FIG. 1, an updatable graphical fitness user interface element 104 is presented to a user 106 (e.g., "Doug Jones") of the wearable device 102. The updatable graphical fitness user interface element 104 may be presented by an application running on the wearable device 102. The updatable graphical fitness user interface element 104 may be presented on an "activity" page of the application.

The wearable device 102 may be associated with an electronic device 108 (e.g., a host device). In some examples, this may include the wearable device 102 being paired with the electronic device 108 in any suitable manner. Pairing of the two devices 102 and 108 may enable the electronic device 108 to function as a proxy for the wearable device 102. In some examples, the wearable device 102 may be configured to capture activity data from the user 106. Such activity data may indicate, for the user 106, a number of steps, an amount of time standing and sitting, a number of calories burned, a number of minutes exercised, and/or any other suitable information. The wearable device 102, the electronic device 108, or any suitable combination of the wearable device 102 and the electronic device 108 may generate the updatable graphical fitness user interface element 104 based, at least in part, on the activity data. The updatable graphical fitness user interface element 104 (and/or other data) may be presented on a screen of the wearable device 102 and/or the electronic device 108.

The electronic device 108, and in some examples the wearable device 102, may also be configured to provide information via one or more networks 110 to a service provider 112. In some examples, the service provider 112 may facilitate communications between the devices illustrated in FIG. 1 and other devices, which may include generating certain communications for the devices in FIG. 1 based at least in part on data received from the devices of FIG. 1 and/or other devices. In some examples, the service provider 112 may include a subscription service according to which communications may be generated and provided. Information that may be included in such communications may include, for example, notifications, the updatable graphical fitness user interface element 104, portions of the collected activity data, and/or messages to and from another user's devices (e.g., a wearable device 114 and an electronic device 116). As described herein, such messages may include offers to share updatable graphical fitness user interface elements, requests to share updatable graphical fitness user interface elements, updates to updatable graphical fitness user interface elements, messages relating to updatable graphical fitness user interface elements, geolocation data, activity data, and any other suitable information relating to updatable graphical fitness user interface elements.

The electronic device 116 and the wearable device 114 may be similar devices to the electronic device 108 and the wearable device 102, respectively. Thus, the electronic device 108 may be associated with the wearable device 102, and may each be associated with a user 118. In an example sharing scenario, the user 106 may send an offer to share the updatable graphical fitness user interface element 104 with the user 118 via the networks 110 and/or the service provider 112. If via the service provider 112, the service provider 112 may facilitate delivery of the offer to the wearable device 114 and/or the electronic device 116. If the user 118 accepts the offer, a communication indicating acceptance may be sent from the wearable device 114 or the electronic device 116 to the service provider 112. Using this communication, the service provider 112 may record (e.g., in a data store or other storage device) that the user 118 has agreed to receive updates relating to the updatable graphical fitness user interface element 104. In some examples, recording in the data store may include subscribing the user 118 to receive updates whenever a container holding data relating to the updatable graphical fitness user interface element 104 is updated. In this manner, when the service provider 112 receives communications from the electronic device 108 and/or the wearable device 102 indicating that the updatable graphical fitness user interface element 104 should be updated (e.g., because the wearable device 102 has collected some activity data), the service provider 112 may update the data in the container and may send updates to user devices of users subscribed to the container (e.g., the user 118 and the associated electronic device 116 and/or the wearable device 114).

In FIG. 1, the user 118 has accepted the offer to share the updatable graphical fitness user interface element 104. Thus, an application of the wearable device 114 has caused the updatable graphical fitness user interface element 104, which is associated with the user 106 (Doug Jones), and other information to be presented on the graphical user interface of the wearable device 114 within a "friends" page of the application. The updatable graphical fitness user interface element 104 is presented on the wearable device 114 as part of a user list 120. The user list 120 may include other users (e.g., Bob Williams and Laura Smith) that use other wearable devices with whom the user 118 has also established a sharing relationship (e.g., the user 118 has accepted offers from Bob and Laura to share their updatable graphical fitness user interface elements). As described herein, the user 118 may use the application to manage the user list 120 and to interact with the users included in the user list 120. The users in the user list 120 may be considered "activity friends."

Figure 2:
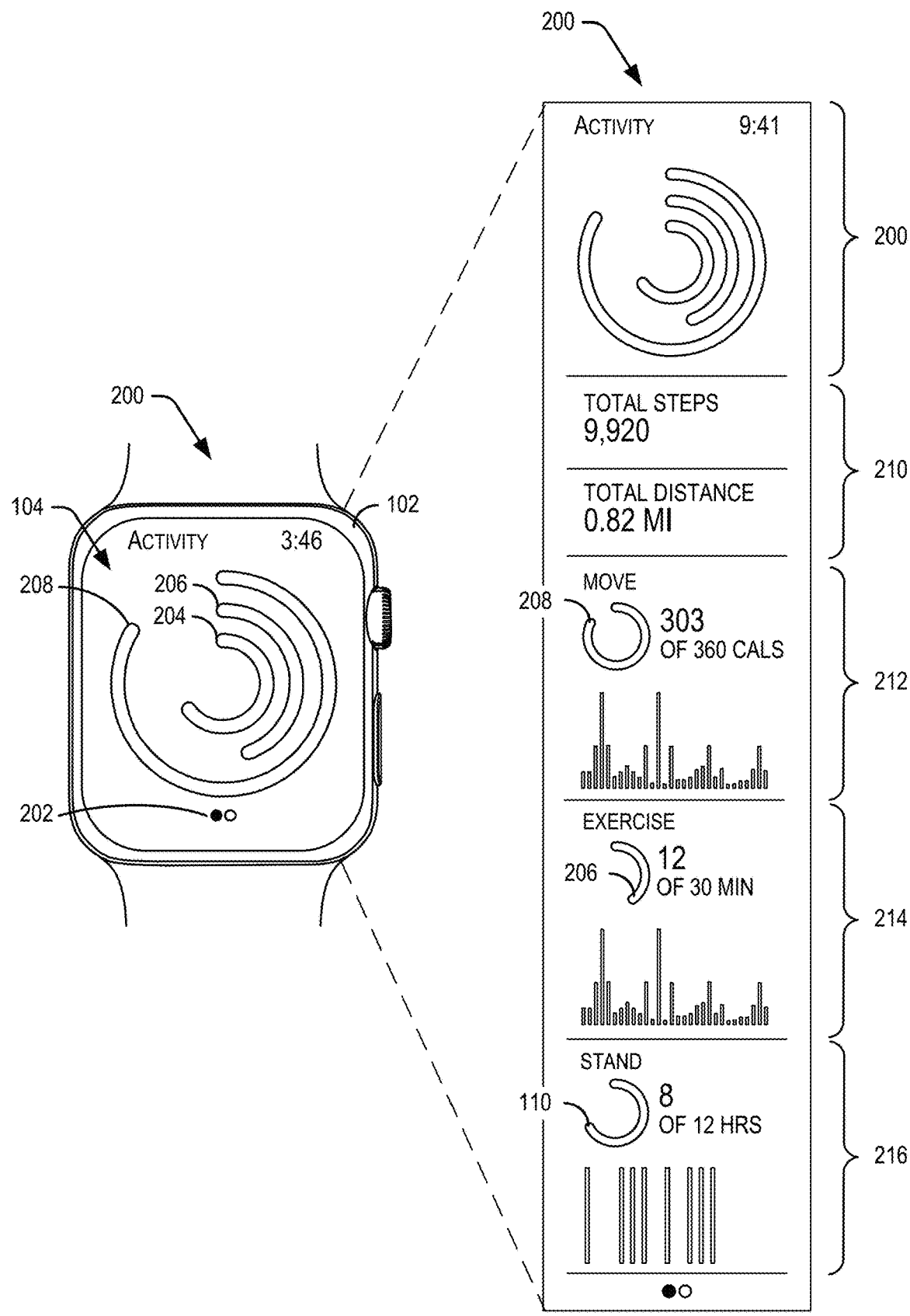
FIG. 2 illustrates an example electronic device including a graphical user interface for displaying an updatable graphical fitness user interface element as described herein, according to at least one example.

FIG. 2 illustrates the wearable device 102 of FIG. 1 including an aggregate view 200 of the updatable graphical fitness user interface element 104, which may be presented on a display of the wearable device 102. The display may be a touch screen or other suitable display, or in some examples, may include a touch-sensitive area separate from the area of the touch screen. An application running on the wearable device 102 may be configured to generate and present the updatable graphical fitness user interface element 104 on the display in an activity page of the application. An indicator 202 may indicate that the current view is the activity page. A swiping input from right to left while the updatable graphical fitness user interface element 104 is visible, may change the activity page to a "friends" page. The "friends" page of the wearable device 114 is discussed with reference to FIG. 3.

The updatable graphical fitness user interface element 104 may include one or more concentric rings 204, 206, and 208. Each concentric ring 204-208 may represent a particular aspect of the historical physical activity data of the user of the wearable device 102 (e.g., the user 106). In this manner, the updatable graphical fitness user interface element 104 may function as an activity indicator to provide a graphical representation of the extent to which the user 106 has been "active" as compared to goals relating to physical activity. For example, the outer ring 208 may represent a daily number of active Calories expended, the center ring 206 may represent a daily number of minutes spent performing physical activity above a physical activity threshold (e.g., an intensity above a brisk walk or 3 metabolic equivalent units (METS)), and the inner ring 204 may represent a number of hours in the day during which the user stood for at least 60 seconds within a 90 second segment of time. As the user performs more physical activities and thereby gets closer to achieving their goals, the concentric rings 204-208 will continue to close. Thus, a closed ring, may correspond to an achieved goal for that physical activity.

Other views 210-216 of the historical physical activity data may be presented on the display of the wearable device 102 in response to a request by the user to perform a scrolling operation (e.g., by performing a swiping gesture from the bottom to the top of the touch-sensitive display) while the graphical fitness user interface element 104 is presented. As shown, the view 210 can include a textual description of the contents of the this view ("Total Steps" and "Total Distance") and a numerical summary of the associated physical activity data ("9,920" steps and "0.82 MI").

As shown, the view 212 can include a textual description of the contents of this view ("Move"), a numerical summary of the associated physical activity data ("303/360 Calories"), a visual indicator representative of the type of the associated physical activity data (a ring that matches the visual indicator on the outer ring 208), and a graphical representation of the physical activity data.

As shown, the view 214 can include a textual description of the contents of this view ("Exercise"), a numerical summary of the associated physical activity data ("12/30 minutes"), a visual indicator representative of the type of the associated physical activity data (a ring that matches the visual indicator on the center ring 206), and a graphical representation of the physical activity data.

As shown, the view 216 can include a textual description of the contents of this view ("Stand"), a numerical summary of the associated physical activity data ("8/12 hours"), a visual indicator representative of the type of the associated physical activity data (a ring that matches the visual indicator on the inner ring 204), and a graphical representation of the physical activity data. In some examples, other views may be provided that include information related to particular workouts that have been performed and awards that have been received by the user 106.

Figure 3:
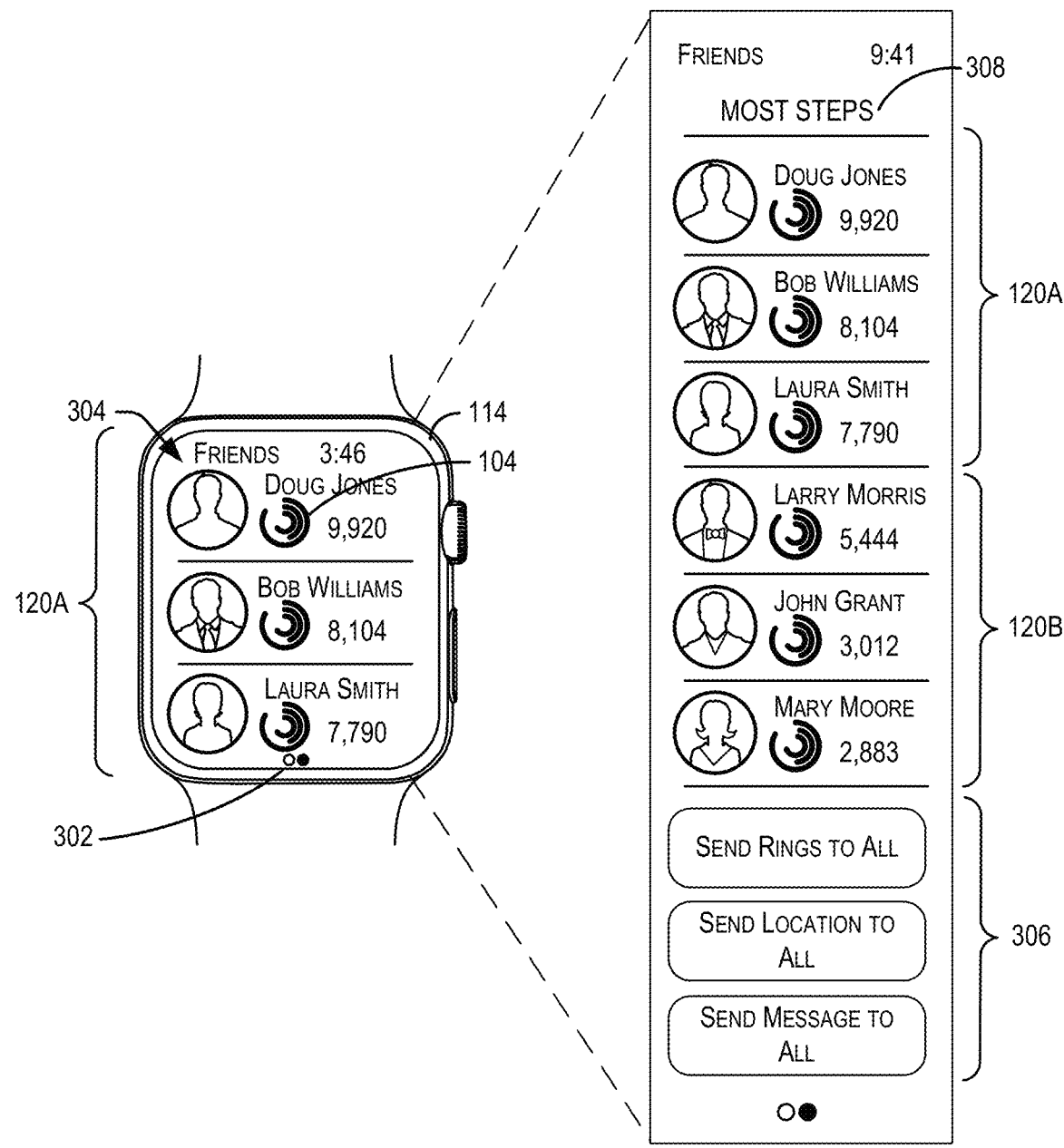
FIG. 3 illustrates an electronic device including a graphical user interface for displaying a set of updatable graphical fitness user interface elements as described herein, according to at least one example.

FIG. 3 illustrates the wearable device 114 of FIG. 1, including a first portion 120A of the user list 120, which is presented on a display of the wearable device 114. The display may be a touch screen or other suitable display, or in some examples, may include a touch-sensitive area separate from the area of the touch screen. An application running on the wearable device 114 may be configured to generate and present the user list 120 on the display in a friends page of the application. An indicator 302 may indicate that the current view is the friends page. A swiping input (e.g., from right to left, or the like) while the user list 120 is visible, may change the friends page to the activity page.

As introduced previously, the user list 120 may include those users who have agreed to share their updatable graphical fitness user interface elements with the user 118 of the wearable device 114 (or those users that use a device similar to the wearable device 114). For example, the user 118 has accepted an offer from the user 106 to share the updatable graphical fitness user interface element 104 and thus it is included in the user list 120. In some examples, if a user from the user list 120 has decided to hide from the user 118, that user may not be populated in the user list 120 or may be populated, but include an indicator that indicates that the user is hiding (e.g., the user may be grayed out). In some examples, the user 118 may select a user from the user list 120 to hide. This may result in that user not being populated in the user list 120 or populated in a different manner (e.g., with an indicator). Indicator for users that are hiding can be different from indicators for users that are being hidden. The updatable graphical fitness user interface element 104, along with associated information (collectively, "user information 304"), is therefore included in the first portion 120A of the user list 120 and presented on the display. The user information 304 can include a textual identifier of the user ("Doug Jones"), a profile image of the user 106, a miniaturized version of the updatable graphical fitness user interface element 104, a numerical summary of a sorted type of physical activity data ("9,920"), and/or any other suitable information related to the user 106. Similar user information can be organized and presented for the other users in the user list 120.

In some examples, the user information 304 may also include information that is being streamed in real-time or near real-time from user devices which associated with the users in the user list 120. For example, if Doug Jones were running a marathon, the user information 304 associated with Doug Jones may include a section that includes Doug's statistics (e.g., minutes/mile, expected finish time, etc.) and/or a map section that shows Doug's location with reference to the marathon route (e.g., a set of shoes or a caricature representative of Doug). Doug's statistics and location may be updated in real-time or near real-time. In some examples, Doug's statistics and location may be updated periodically (e.g., every 15 minutes) together with the updates to the updatable graphical fitness user interface element.

A second portion 120B of the user list 120 and a set of communication options 306 may be presented on the display of the wearable device 114 in response to a request by the user to perform a scrolling operation (e.g., by performing a swiping gesture from the bottom to the top of the touch-sensitive display) while the first portion 120A of the user list 120 is presented on the display. Like the first portion 120A, the second portion 120B of the user list 120 may include user information for other users that are sharing activity data with the user 118 (or other users that use devices similar to the wearable device 114).

The set of communication options 306 may include a set of user interface (UI) buttons, which may be selected by the user 118 in any suitable manner (e.g., using a touch gesture at the wearable device 114 or using a sustained pressure gesture at the wearable device 114). Selection of the buttons may cause certain communications to be sent to the users on the user list 120. For example, selection of the "Send Rings to All" option can send a current updatable graphical fitness user interface element of the user 118 to all of the users on the user list 120, selection of the "Send Location to All" can send a geographic location of the wearable device 114 to all of the users on the user list 120, and selection of the "Send Message to All" can send a generic or specific message to each of the users on the user list 120. Each of these options may be available to the user 118 (e.g., presented on the wearable device 114), at least in part, because the users on the user list 120 have accepted offers from the user 118 to receive the updatable graphical fitness user interface element of the user 118. This may be in addition to the user 118 having accepted offers to share updatable graphical fitness user interface elements from each of the users on the user list 120. In this manner, two-way sharing relationships may be established between the user 118 and the other users on the user list 120.

In some examples, activity data may be provided by the wearable device 114 to the service provider 112 for distribution to the users on the user list 120 according to a set interval (e.g., every 15 minutes), according to priority compared to other communications, in response to completion of a predetermined activity (e.g., closing of a concentric ring of an updatable graphical fitness user interface element), in response to completion of a goal (e.g., an activity goal not represented by the updatable graphical fitness user interface element, such as completing a workout), in response to user input (e.g., selection of the "Send Rings to All" option), or in any other suitable manner. Thus, selection of the "Send Rings to All" option may enable the user 118 to immediately send their updatable graphical fitness user interface element to the users on the user list 120. The receiving users may be notified when an updatable graphical fitness user interface element is received which was sent by the user 118. For example, after the user 118 selects that their updatable graphical fitness user interface element is to be sent to all users, each user device (e.g., electronic devices and/or wearable devices) of each other user receives the updatable graphical fitness user interface element and generates a notification indicating that an updated updatable graphical fitness user interface element has been received. In some examples, the service provider 112 generates the notification and provides it to each user device with the updated updatable graphical fitness user interface element. In response, the user that receives the notifications may send back updates to their updatable graphical fitness user interface elements and/or send a message to the user 118. For example, in response to receiving an updated updatable graphical fitness user interface element (indicating that the sending user has closed a ring), a recipient may send a message such as "You are on it today . . . I'm being lazy" along with their own updatable graphical fitness user interface element that may implicitly indicate that they have completed very few activities for the day.

Selection of the "Send Location to All" option may send location information such as a set of geographic coordinates that may be interpreted by a mapping application running on wearable devices and/or electronic devices. The mapping application may interpret the geographic coordinates or other location information to correspond to a particular location. For example, if the geographic coordinates match or otherwise fall within a threshold distance of a particular gymnasium (e.g., Silver's Gym), the mapping application may indicate that the "location" of the user 118 is at Silver's Gym. In some examples, the "Send Location to All" option may be implemented via a native messaging application operating on the wearable devices and/or the electronic devices. For example, the location information may be provided as a text message, iMessage, multimedia message, or any messaging formatting that supports text and/or data.

Selection of the "Send Message to All" option may send a message to each of the users on the user list 120. The message may be any suitable message supported by the messaging applications of the wearable devices and/or the electronic devices. In some examples, selecting this option may open a messaging application on the wearable device 114 or the electronic device 116. From this messaging application, the user 118 may prepare and send the messages, which may be a single message to a group of recipients including all of the users from the user list 120 or as multiple message threads to each individual user from the user list 120. The content of the messages may include, for example, text, audio recordings, images (e.g., pictures, emoticons, emojis, or the like), or videos. In some examples, at least a portion of the content of the message may be selected by the user 118 from one or more libraries of pre-generated content. The pre-generated content may be particular to promoting wellness, motivating fitness, promoting competition, and for any other suitable purpose. An example text library may include pre-generated text strings such as "Keep up the good work!", "You're going down!", "Shazam!", etc. An example emoji library may include pre-generated emojis that are particular to fitness (e.g., a face with flexing arms, a face lifting a dumbbell, a tired face, etc.). In some examples, a message may be sent to each of the users on the user list 120 that includes a challenge. For example, a fitness trainer may send a challenge for each of her clients to run 5 miles on a certain day. This challenge can be recorded by the user devices that receive the challenge and a notification can be generated and provided to subscribed user devices when the users complete the challenge.

The user list 120 may be sorted in any suitable manner. For example, as illustrated by sorting identifier 308 in FIG. 3, the user list 120 can be sorted according to most steps. In this manner, the user list 120 may become a ranked list with the user ranked according to steps. Thus, the dimension displayed below each user's name is the numeric quantity of steps the user has taken during the current period (e.g., the current day), with Doug Jones having taken the most steps ("9,920") and Mary Moore having taken the fewest steps ("2,883"). Other dimensions that can be used for ranking include, for example, percentage of move goal, exercise minutes, calories burned, last best workout, or any other activity dimension. The user list 120 may also be sorted alphabetically, by duration of sharing period, and in any other suitable manner.

In some examples, the user list 120 may be divided to create one or more subsets of users based on characteristics and/or identity. For example, a fitness trainer may create a subset of users that includes clients, a subset of users that includes cycling friends, and/or a subset of users that includes family members. By interacting with the display of the wearable device 114, the user may toggle between views that include the different subsets of users and all of the users together. Individual users in each subset of users may also be sorted and ranked as described herein. In addition, individual subsets of users may be sorted and ranked relative to other subsets of users. In this manner, groups of users may be compared to other groups of users.

Figure 4:
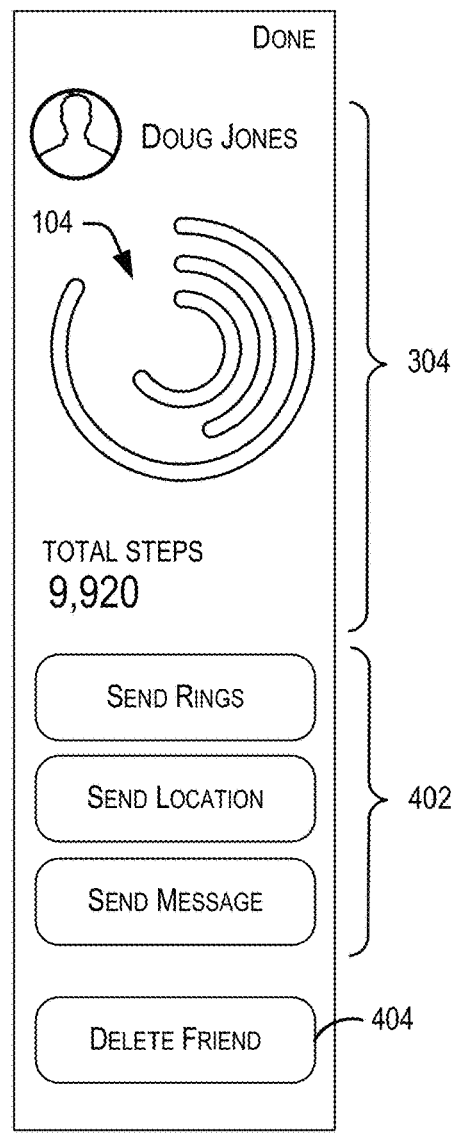
FIG. 4 illustrates an example view relating to interacting with a user that has shared an updatable graphical fitness user interface element as described herein, according to at least one example.

FIG. 4 illustrates a detailed activity view 400 that includes the user information 304 that may be presented on the display of the wearable device 114 to a request by the user 118 to perform a selection of an area of the user list 120 that corresponds to the user 106. Thus, while the user information 304 corresponds to the user 106, it is understood that other user information corresponding to each of the other users in the user list 120 may be presented when selected. In the illustrated example, the user 118 has selected the area corresponding to the user 106 in the user list 120 using any suitable technique including a touch gesture received at the wearable device 114 or a sustained pressure gesture received at the wearable device 114. In response to the selection, the user information 304 has been presented (e.g., a textual identifier of the user ("Doug Jones"), a profile image of the user 106, the updatable graphical fitness user interface element 104, and/or a numerical summary of a sorted type of physical activity data ("9,920")). Other user information 304 described herein may also be presented.

A set of communication options 402 and a deletion option 404 may also be presented on the display of the wearable device 114 in response to a request by the user to perform a scrolling operation (e.g., by performing a swiping gesture from the bottom to the top of the touch-sensitive display) while the user information 304 is presented on the display. The set of communication options 402 may include a set of buttons, which may be selected by the user 118 in any suitable manner (e.g., using a touch gesture at the wearable device 114 or using a sustained pressure gesture at the wearable device 114). Selection of the buttons may cause certain communications to be sent to the user 106 associated with the user information 304 that is displayed. Thus, the set of communication options 402 may function similarly to the set of communications options 306, except that the set of communication options 402 only send communications to the selected user, and not all users on the user list 120. The deletion option 404 may correspond to a deletion button that, if selected, may terminate the sharing relationship with the user 106. Thus, selection of the deletion option 404 may cause the user 106 to be removed from the user list 120 and result in the cessation of sending activity updates relating to the activities of the user 118 to the user 106 and receiving activity updates relating to the activities of the user 106.

Figure 5:
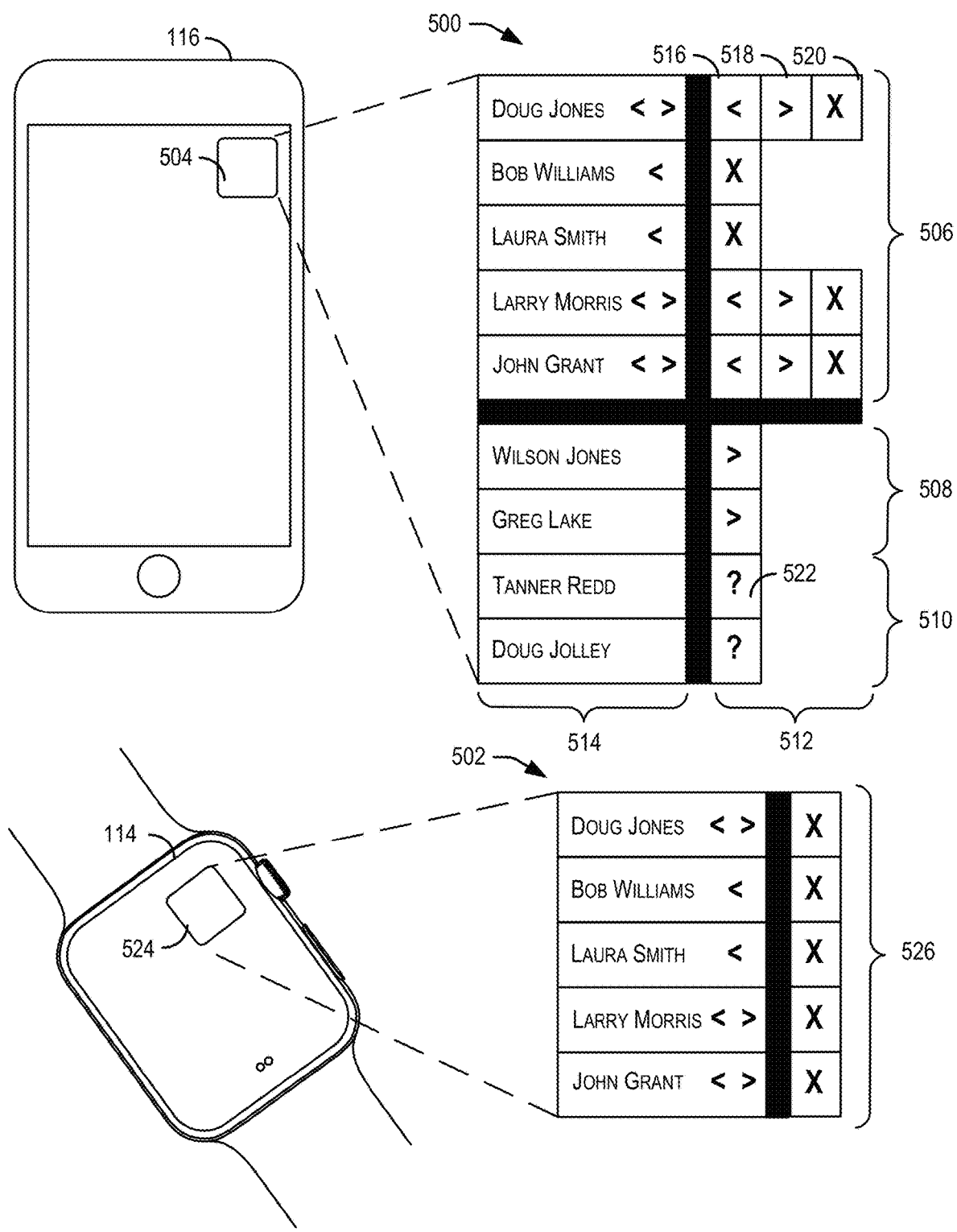
FIG. 5 illustrates example menus relating to sharing updatable graphical fitness user interface elements as described herein, according to at least one example.

FIG. 5 illustrates example menus 500 and 502 relating to sharing updatable graphical fitness user interface elements. The menu 500 may be generated by an application 504 running on the electronic device 116. The application 504 may also cause the menu 500 to be presented on a display of the electronic device 108. The menu 500 may be formatted to include one or more sets of users. For example, the menu 500 may include a set of sharing users 506, a set of known potential users 508, and a set of known improbable users 510. The menu 500 may include an information section 514 and an action section 512. The sets of users 506-510 may be identified in the information section 514. Within the action section 512, one or more actions that may be performed with respect to each of the users in the sets of users 506-510 may be identified.

The users in the set of sharing users 506 may correspond, at least in part, to the users on the user list 120. Thus, each of the users in the set of sharing users 506 may have some level of a sharing relationship with the user 118. The level of sharing may be indicated in the information section 514 following the users' names. The user 118 may have a two-way sharing relationship with Doug Jones, Larry Morris, and John Grant (e.g., these users may receive activity updates associated with the user 118 and provide activity updates to the user 118). A two-way sharing relationship may be represented by "< >". The action section 512 may include one or more icons 516-522. Each icon may represent a different action that may be taken with respect to the user identified in the information section 514. For example, selection of the icon 516 (">") may terminate receiving of activity updates associated with relevant user. This may result in a first form of one-way sharing—only providing updates. Similarly, selection of the icon 518 ("<") may terminate sending of activity updates associated with the user 118. This may result in a second form of one-way sharing—only receiving updates. Selection of the icon 520 ("X") may terminate receiving and sharing of activity updates (e.g., remove the user from being an activity friend). In some examples, any of the icons 516-522 may be selected using any suitable gesture (e.g., a left-to-right swipe, a right-to-left swipe, a pressure gesture, a selection gesture, etc.).

The user 118 may have a one-way sharing relationship with Bob Williams and Laura Smith (e.g., these users provide activity updates to the user 118, but these users do not receive activity updates associated with the user 118). This type of one-way sharing relationship may be represented by "<". With respect to these users, the action section 512 may include functionality to terminate receiving activity updates (e.g., removing these users from being activity friends with the user 118).

The set of known potential users 508 may include users that are identifiable from a set of contacts associated with the electronic device 116 and that are known to be associated with appropriate devices for tracking and/or sharing activity data or the like. Wearable devices described herein are examples of such devices. Thus, the users in the set of known potential users 508 are users with whom the user 118 is not currently sharing activity updates, but with whom the user 118 could share, if desired. Thus, the action that may be taken with respect to these users is for the user 118 to offer to share their activity updates with these users. This may be indicated by the icon 518 ">". Selection of the icon 518 corresponding to Wilson Jones may cause an offer to share an updatable graphical fitness user interface element to be provided to a user device associated with Wilson Jones. In some examples, selection of the icon 518 corresponding to Wilson Jones may cause a request to share an updatable graphical fitness user interface element to be provided to the user device associated with Wilson Jones. A request to share may be a request for Wilson Jones to share his updatable graphical fitness user interface element, while an offer to share may be an offer for Wilson Jones to receive an updatable graphical fitness user interface element from the user 118.

The set of known improbable users 510 may include users that are identifiable from a set of contacts associated with the electronic device 116 and for whom it is unknown whether they are associated with appropriate devices for tracking and/or sharing activity data or the like. Thus, the users in the set of known improbable users 510 are users with whom the user 118 is not currently sharing and with whom sharing is unlikely because it cannot be determined whether the users are associated with appropriate devices for tracking and/or sharing activity data or the like. Thus, the action that may be taken with respect to these users is for the user 118 to invite these other users to obtain an appropriate device and begin sharing. This may be indicated by icon 522 "?". Selection of the icon 522 corresponding to Tanner Redd may cause an invitation to obtain an appropriate device to be provided to a user device associated with Tanner Redd. In some examples, a record of this invitation may be recorded (e.g., by the service provider 112) such that if Tanner Redd does register an appropriate device in the future, the user 118 may be prompted as to whether they would like to now send a request to share or an offer to share their updatable graphical fitness user interface element with Tanner Redd. Tanner Redd may also be notified and/or reminded that the user 118 sent him the invitation previously. In this manner, Tanner Redd may initiate a request to share or an offer to share their updatable graphical fitness user interface element with the user 118.

The menu 502 may be generated by an application 524 running on the wearable device 114. The application 524 may also cause the menu 502 to be presented on a display of the wearable device 114. The menu 502 may be formatted to include a set of sharing users 526. The set of sharing users may match the set of sharing users 506. In some examples, the functionality of the application 524 for interacting with the set of sharing users may be limited as compared to the functionality of the application 504. For example, the application 524 may enable the user 118 to terminate sharing updatable graphical fitness user interface elements and/or receiving updatable graphical fitness user interface elements from the sharing users, but may not enable the user 118 to invite new users. In some examples, however, the functionality of the application 524 is similar to that as described with reference to the menu 500. In other words, more detailed lists of users may be presented with enhanced functionality for interacting with the users.

Figure 6:
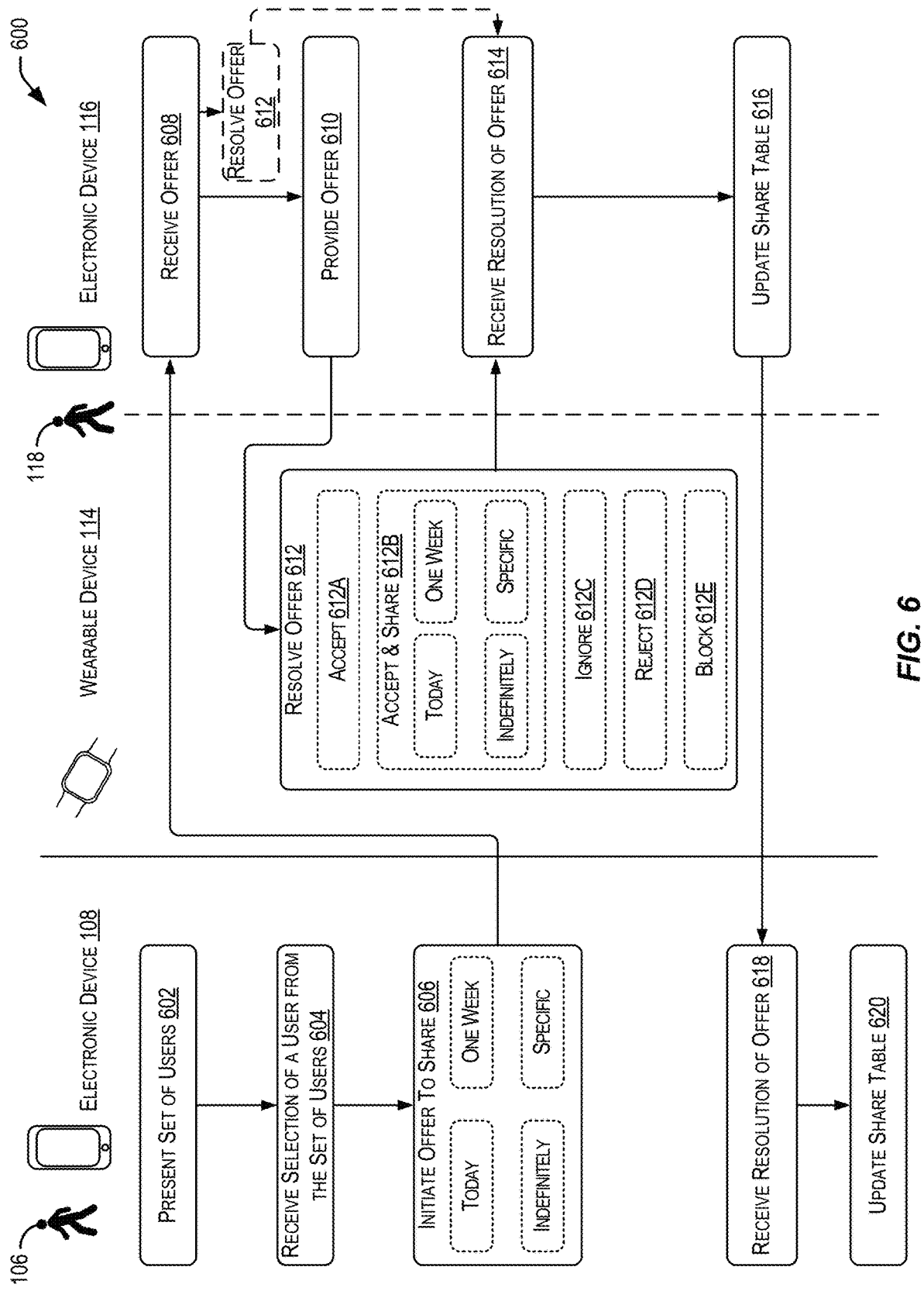
FIG. 6 illustrates a flowchart of a method for sharing updatable graphical fitness user interface elements as described herein, according to at least one example.
Figure 7:
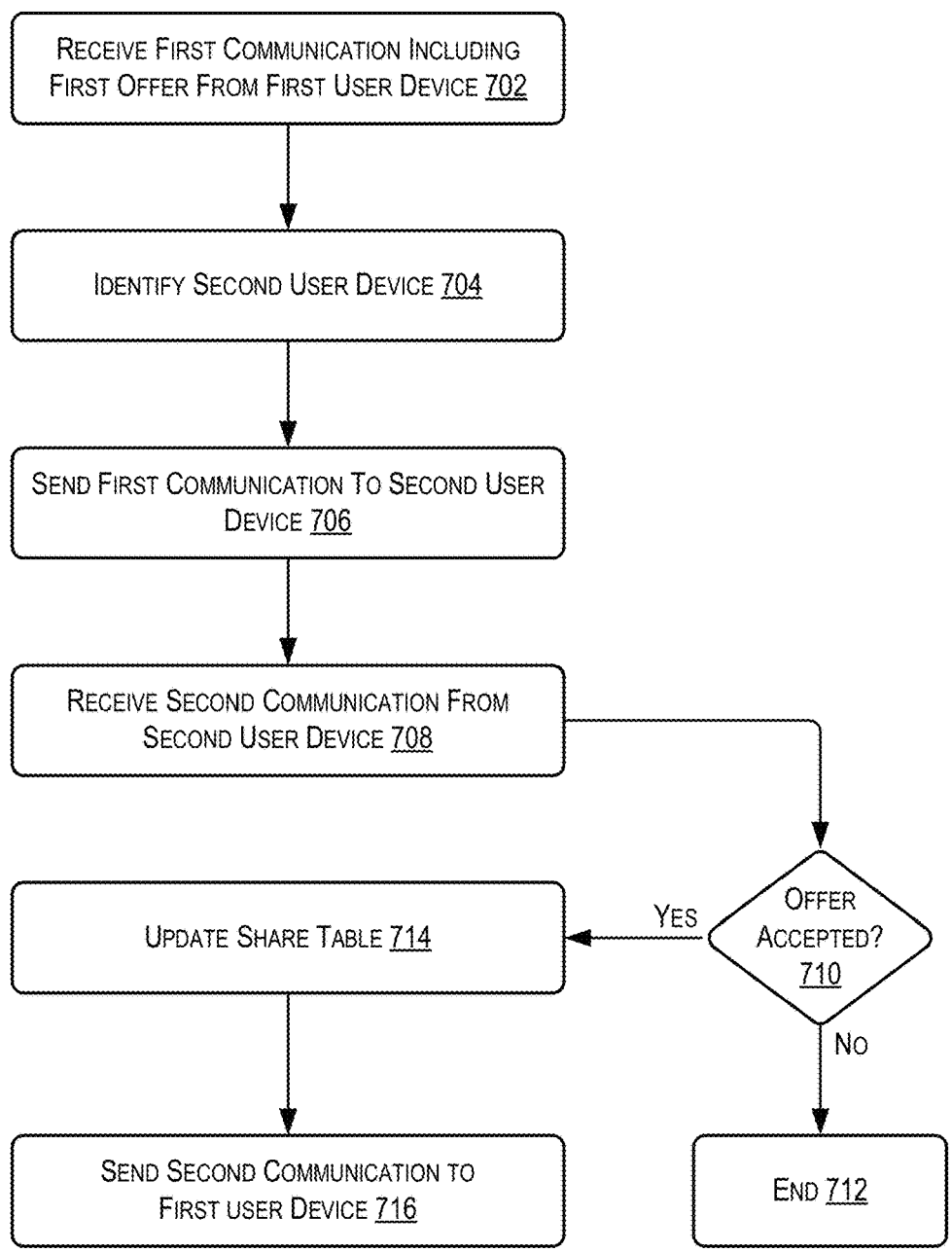
FIG. 7 illustrates another flowchart of a method for sharing updatable graphical fitness user interface elements as described herein, according to at least one example.

FIGS. 6 and 7 illustrate example flow diagrams showing processes 600 and 700 for sharing updatable graphical fitness user interface elements, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 600 may be performed by the electronic device 108, the wearable device 114, and the electronic device 116. The wearable device 114 and the electronic device 116 may be paired and associated with a single user. The electronic device 108 may be paired with a different wearable device and associated with a different user. The process 600 may begin at 602 by presenting a set of users. In some examples, presenting the set of users may be performed by an activity module of the electronic device 108, which may be implemented as part of an activity application. The set of users may be populated based at least in part on a personal contact list that is stored in a contacts application of the electronic device 108. Thus, it is likely that the contacts on the personal contact list are known to the user of the electronic device 108. The set of users may also be populated based at least in part on information that indicates which contacts from the contact list are associated with wearable devices. Thus, it is likely that the users in the set of users own or have access to wearable devices and can therefore participate in sharing of updatable graphical fitness user interface elements and associated activity data. The set of users may be presented to user 106 on the display of the electronic device 108.

At 604, the process 600 receives selection of a user from the set of users. In some examples, receiving selection of the user from the set of users may be performed by the activity module of the electronic device 108. The selection may be received in response to user input. For example, the user 106 may select the user from the set of users presented at 602 by interacting with a touch screen display of the electronic device 108.

At 606, the process 600 initiates an offer to share an updatable graphical fitness user interface element associated with the user selected at 604. The updatable graphical fitness user interface element may be associated with the user 106 of the electronic device 108. In some examples, initiating the offer may be performed by the activity module of the electronic device 108. Initiating the offer may include presenting an interface from which the user 106 can select one or more conditions to be associated with sharing the updatable graphical fitness user interface element. For example, the user 106 may select how long their updatable graphical fitness user interface element will be shared with the other user. In this example, the updatable graphical fitness user interface element may be shared for a day ("Today"), for one week ("One Week"), until the user 106 revokes sharing ("Indefinitely"), or for a user-defined time period ("Specific"). In this manner, the user 106 may have control over the length of time that they are willing to share their updatable graphical fitness user interface element. In some examples, the length of time for sharing the updatable graphical fitness user interface element may be a default time, which may be predetermined, learned, or otherwise determined prior to the offer being initiated at 606. Other conditions may indicate a threshold amount of activity data received from the other user, a threshold amount of activity reached by either user, and/or a threshold amount of data used by devices of the receiving user.

Initiating the offer may also include sending the offer to the electronic device 116 and/or the wearable device 114. In some examples, sending the offer may include sending a first communication to a service provider, which then sends a second communication to the electronic device 116 and/or the wearable device 114 that includes the offer.

At 608, the process 600 receives the offer. In some examples, receiving the offer may be performed by a messaging module of the electronic device 116, which may be implemented as part of an messaging application. For example, the second communication from above may be sent by the service provider to the electronic device 116 using a messaging protocol implemented by the messaging application. In some examples, receiving the offer may include receiving the offer as a notification.

At 610, the process 600 provides the offer. In some examples, providing the offer may be performed by the messaging module of the electronic device 116. In some examples, receiving the offer and providing the offer may be performed by the electronic device 116 acting as a proxy for the wearable device 114, which may mean that these functions are performed as background operations and provided to the wearable device 114. For example, the electronic device 116 may receive the offer as part of a message, as part of a notification, or otherwise and provide the offer as part of a message, as part of a notification, or otherwise to the wearable device 114. Thus, providing the offer may include providing the offer to the wearable device 114.

At 612, the process 600 resolves the offer. In some examples, resolving the offer may be performed by an activity module of wearable device 114, which may be implemented as part of an activity application. Resolving the offer may include determining how to respond to the offer based at least in part on the conditions included in the offer. Resolving the offer may include presenting an interface including one or more options. Selection of an option by the user 118 may resolve the offer. For example, at 612A, the user 118 may accept the offer. Selection of the option at 612A may cause an acceptance acknowledgement to be sent back to the electronic device 108. Selection of the option 612A may cause the wearable device 114 and/or the electronic device 116 to receive updates relating to the updatable graphical fitness user interface element associated with the user 106. Thus, a one-way sharing relationship may be established. In some examples, selection of the option 612A may be sufficient for the user 118 to begin sharing their updatable graphical fitness user interface elements with the user 106 of the electronic device 108 and/or the wearable device 102. Thus, a two-way sharing relationship may be established simply by virtue of the user 106 accepting the offer, without the user 106 explicitly selecting one of the accept and share back options at 612B.

At 612B, the user 118 may accept the offer and initiate an offer to share back. Selection of the option 612B may cause a second offer to be generated and provided to the electronic device 108 and/or a wearable device associated with the electronic device 108. Similar to the options at 606, the user 118 may select how long to share their updatable graphical fitness user interface element with the user 106. In this example, the updatable graphical fitness user interface element may be shared for a day ("Today"), for one week ("One Week"), until the user 118 revokes sharing ("Indefinitely"), or for a user-defined time period ("Specific"). It is understood that the updatable graphical fitness user interface element may be shared for any other suitable period of time. In some examples, selection of the offer to share back at 612B may function as an implicit acceptance of the first offer from the electronic device 108. However, in other examples, an acceptance acknowledgment may also be sent together with the second offer to the electronic device 108. Thus, a two-way sharing relationship may be established, so long as the user 106 accepts the second offer.

At 612C, the user 118 may ignore the offer. Ignoring the offer may include taking no action on the offer. If no action is taken on the offer for a certain period of time, the offer may expire. In this manner, the user 106 of the electronic device 108 may not receive an explicit rejection of the offer. Thus, a sharing relationship between the two users will not be established at this point.

At 612D, the user 118 may reject the offer. Rejecting the offer may include sending a rejection acknowledgement to the electronic device 108. The rejection acknowledgement may indicate that the user 118 has declined the offer to share the updatable graphical fitness user interface element. If the offer is rejected, a sharing relationship between the two users will not be established.

At 612E, the user 118 may block the offer. Blocking the offer may include requesting that the user 106 and/or the electronic device 108 be placed on a blacklist. The blacklist may be stored by the service provider and checked when a new offer is initiated to ensure that the initiator has not been blocked by the recipient. In some examples, a first user may request that a second user be placed on a blacklist even after the first user has accepted an offer from the second user to share an updatable graphical fitness user interface element. In some examples, the user 118 may preselect which users from whom the user will accept offers. The process of preselection may include setting a preselected time period for sharing. For example, a husband may indicate (e.g., by selecting a setting in the activity application), prior to receiving an offer from his wife, that he agrees to accept any offers extended from his wife's device(s) for one month. Thus, in some examples, when the electronic device 116 receives the offer at 608, it may immediately, and without input from the user 118, resolve the offer according to the preselection.

While resolving the offer has been primarily discussed with reference to the wearable device 114, it is understood that the offer may also be resolved by the electronic device 116. Thus, resolving the offer is also shown in dashed lines under the electronic device 116.

Once the offer is resolved at 612 (whether by the wearable device 114 or the electronic device 116), at 614, the process 600 receives a resolution of the offer. Receiving the resolution of the offer may be performed by the activity module of the electronic device 116. In some examples, receiving the resolution of the offer may be performed as a background operation.

At 616, the process 600 updates a share table. In some examples, updating the share table may be performed by the activity module of the electronic device 116. The share table may be stored locally on the electronic device 116 and may be updated locally. In some examples, the share table may be stored by the service provider, and updating the share table may include sending one or more communications to the service provider to update the share table. In some examples, copies of the share table may be stored in multiple locations and across multiple devices. The share table, for the electronic device 116 and/or the user 118, may identify which user devices are sharing updatable graphical fitness user interface elements with the electronic device 116 and with which user devices the electronic device 116 is sharing its updatable graphical fitness user interface element. Thus, the share table may be used to determine which user devices are to receive updates to which updatable graphical fitness user interface elements.

At 618, the process 600 receives a resolution of the offer. In some examples, this may be performed by the activity module of the electronic device 108. Receiving the resolution may be in response to the electronic device 116 receiving the resolution of the offer at 614. Depending on the type of resolution selected at 612, the resolution may be received as a message, a notification, or not received at all.

At 620, the process 600 updates the share table. In some examples, updating the share table may be performed by the activity module of the electronic device 108. Similar to updating the share table at 616, the share table may be stored locally on the electronic device and may be updated locally. In some examples, the share table may be stored by the service provider, and updating the share table may include sending one or more communications to the service provider to update the share table. In some examples, copies of the share table may be stored in multiple locations and across multiple devices. The share table, for the electronic device 108 and/or the user 106, may identify which user devices are sharing updatable graphical fitness user interface elements with the electronic device 108 and with which user devices the electronic device 108 is sharing its updatable graphical fitness user interface element. Thus, the share table may be used to determine which user devices are to receive updates to which updatable graphical fitness user interface elements.

In some examples, the service provider 112 (e.g., utilizing at least an activity module 854 shown in FIG. 8) may perform the process 700 of FIG. 7. The process 700 may begin at 702 by receiving a first communication including a first offer from a first user device. The first offer may be an offer to share a first updatable graphical fitness user interface element associated with the first user device. The first user device may be any suitable user device including, for example, a mobile device, a wearable device, a laptop computer, a desktop computer, and the like. The first communication may identify a second user to whom the first communication is directed. For example, the second user may have been previously selected from a contact list populated on the first user device. In some examples, the first communication may identify contact information for reaching a user device associated with the second user.

At 704, the process 700 identifies a second user device. In some examples, identifying the second device may include identifying based at least in part on the second user and/or contact information associated with the second user. The second user device may be any suitable user device. Identifying the second user device may include using the contact information, user identifier, or the like received previously to identify the second user device in a table of user devices stored by the service provider.

At 706, the process 700 sends the first communication to the second user device. In some examples, sending the first communication may include sending at least a portion of the first communication or sending a variation of the first communication. As the communication may include the first offer, sending the first communication may include sending the first offer to the second user device. The first communication may be sent as a message to the second user device, which may be accessed via a messaging application on the second user device. Sending the first communication to the second user device may include sending the first communication to an electronic device and/or to a wearable device.

At 708, the process 700 receives a second communication from the second user device. Receiving the second communication may be received in response to sending the first communication. For example, the second user device may receive the first communication, a user may interact on the second user device with the first communication, and the second user device may generate the second communication, which may be sent to the service provider. The second communication may include information indicating how the user of the second user device resolved the first offer.

At 710, the process 700 determines whether the first offer is accepted. In some examples, determining whether the first offer is accepted may be based at least in part on the second communication. For example, this determination may be performed by analyzing the second communication to determine whether it indicates acceptance of the first offer. If not, then the process 700 ends at 712. If yes, the process 700 continues to 714. At 714, the process 700 updates a share table. Updating the share table may include updating a subscription to the share table that indicates that the second user device is to receive updates to the updatable graphical fitness user interface element associated with the first user device. In some examples, the share table is organized according to user, but also identifies which user devices are associated with the user and which user devices are subscribed to the user and/or the user's devices. In this manner, the share table can be used to determine which user devices to send updates to when updated activity data for the user is received. In some examples, the share table is accessed each time updated activity data is received, which may be according to some fixed interval or otherwise as discussed herein.

At 716, the process 700 sends the second communication to the first user device. The second communication may indicate how the first offer has been accepted. In some examples, the second communication may include a second offer from the user of the second user device to share an updatable graphical fitness user interface element associated with this user.

Figure 8:
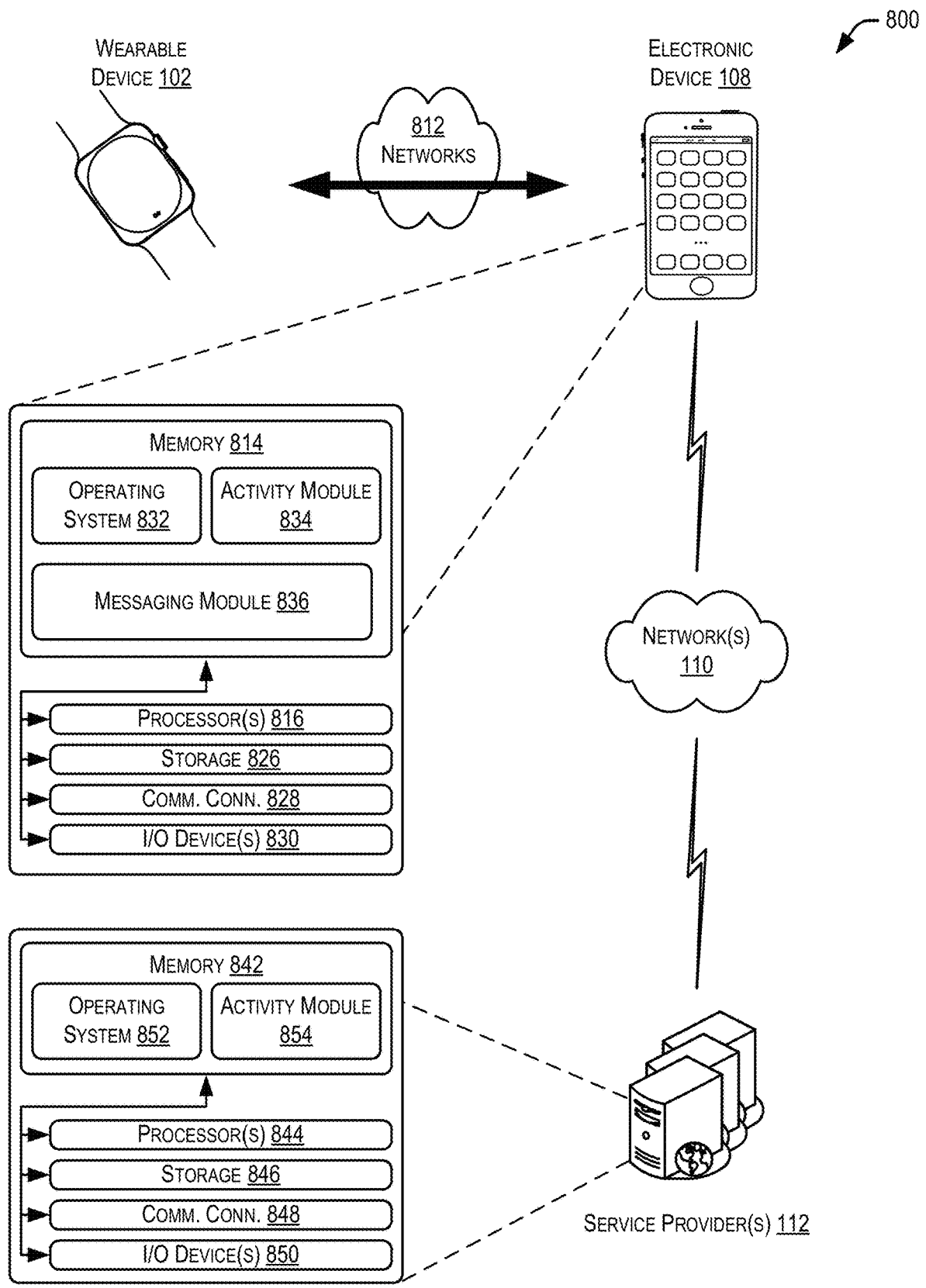
FIG. 8 illustrates a simplified block diagram including an example architecture for sharing updatable graphical fitness user interface elements as described herein, according to at least one example.

FIG. 8 illustrates an example architecture or environment 800 configured to implement sharing of updatable graphical fitness user interface elements, according to at least one example.

In some examples, the example architecture 800 may further be configured to manage or otherwise interact with the wearable device 102, the electronic device 108, and/or the service provider computers 112 of FIG. 1. In some examples, the devices may be connected via one or more networks 110 and/or 812 (e.g., via Bluetooth, WiFi, the Internet, or the like). In the architecture 800, one or more users may utilize the electronic device 108 to manage, control, or otherwise utilize the wearable device 102, via the one or more networks 812. Additionally, in some examples, the wearable device 102, the service provider computers 112, and electronic device 108 may be configured or otherwise built as a single device. For example, the wearable device 102 and/or the electronic device 108 may be configured to implement the embodiments described herein as a single computing unit, exercising the examples described above and below without the need for the other devices described.

In some examples, the networks 110, 812 may include any one or a combination of many different types of networks, such as cable networks, the Internet, wireless networks, cellular networks, satellite networks, other private and/or public networks, or any combination thereof. While the illustrated example represents the electronic device 108 accessing the service provider computers 112 via the networks 110, the described techniques may equally apply in instances where the electronic device 108 interacts with the service provider computers 112 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.).

As noted above, the electronic device 108 may be configured to collect and/or manage user activity data potentially received from the wearable device 102. In some examples, the wearable device 102 may be configured to provide health, fitness, activity, and/or medical data of the user to a third- or first-party application (e.g., the service provider 112). In turn, this data may be used by the electronic device 108 to present the updatable graphical fitness user interface element described herein. The electronic device 108 may be any type of computing device such as, but not limited to, a mobile phone, a smartphone, a personal digital assistant (PDA), a laptop computer, a desktop computer, a thin-client device, a tablet computer, a wearable device, or the like. In some examples, the electronic device 108 may be in communication with the service provider computers 112 and/or the wearable device 102 via the networks 110, 812, or via other network connections.

In one illustrative configuration, the electronic device 108 may include at least one memory 814 and one or more processing units (or processor(s)) 816. The processor(s) 816 may be implemented as appropriate in hardware, computer-executable instructions, firmware, or combinations thereof. Computer-executable instruction or firmware implementations of the processor(s) 816 may include computer-executable or machine-executable instructions written in any suitable programming language to perform the various functions described. The electronic device 108 may also include geo-location devices (e.g., a global positioning system (GPS) device or the like) for providing and/or recording geographic location information associated with the electronic device 108.

The memory 814 may store program instructions that are loadable and executable on the processor(s) 816, as well as data generated during the execution of these programs. Depending on the configuration and type of the electronic device 108, the memory 814 may be volatile (such as random access memory (RAM)) and/or non-volatile (such as read-only memory (ROM), flash memory, etc.). The electronic device 108 may also include additional removable storage and/or non-removable storage 826 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 814 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 814 and the additional storage 826, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 814 and the additional storage 826 are both examples of non-transitory computer storage media. Additional types of computer storage media that may be present in the electronic device 108 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the electronic device 108. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The electronic device 108 may also contain communications connection(s) 828 that allow the electronic device 108 to communicate with a data store, another computing device or server, user terminals, and/or other devices via the networks 110, 812. The electronic device 108 may also include I/O device(s) 830, such as a keyboard, a mouse, a pen, a voice input device, a touch input device, a display, speakers, a printer, etc.

Turning to the contents of the memory 814 in more detail, the memory 814 may include an operating system 832 and/or one or more application programs or services for implementing the features disclosed herein including an activity module 834 and a messaging module 836. In some examples, the activity module 834 may be configured to manage activity data collected by the wearable device 102 and generate an updatable graphical fitness user interface element based at least in part on the activity data. In some examples, the messaging module 836 may be configured to manage the sharing (receiving and providing) of updatable graphical fitness user interface elements as described herein. In some examples, the messaging module 836 may be configured to manage notifications relating to sharing updatable graphical fitness user interface elements.

The service provider computers 112 may also be any type of computing device such as, but not limited to, a mobile phone, a smartphone, a PDA, a laptop computer, a desktop computer, a thin-client device, a tablet computer, a wearable device, etc. In some examples, the service provider computers 112 may be in communication with the electronic device 108 and/or wearable device 102 via the networks 110, 812, or via other network connections.

In one illustrative configuration, the service provider computers 112 may include at least one memory 842 and one or more processing units (or processor(s)) 844. The processor(s) 844 may be implemented as appropriate in hardware, computer-executable instructions, firmware, or combinations thereof. Computer-executable instruction or firmware implementations of the processor(s) 844 may include computer-executable or machine-executable instructions written in any suitable programming language to perform the various functions described.

The memory 842 may store program instructions that are loadable and executable on the processor(s) 844, as well as data generated during the execution of these programs. Depending on the configuration and type of service provider computer 112, the memory 842 may be volatile (such as RAM) and/or non-volatile (such as ROM, flash memory, etc.). The service provider computer 112 may also include additional removable storage and/or non-removable storage 846 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 842 may include multiple different types of memory, such as SRAM, DRAM, or ROM. While the volatile memory described herein may be referred to as RAM, any volatile memory that would not maintain data stored therein once unplugged from a host and/or power would be appropriate. The memory 842 and the additional storage 846, both removable and non-removable, are both additional examples of non-transitory computer-readable storage media.

The service provider computer 112 may also contain communications connection(s) 848 that allow the service provider computer 112 to communicate with a data store, another computing device or server, user terminals and/or other devices via the networks 110, 812. The service provider computer 112 may also include I/O device(s) 850, such as a keyboard, a mouse, a pen, a voice input device, a touch input device, a display, speakers, a printer, etc.

Turning to the contents of the memory 842 in more detail, the memory 842 may include an operating system 852 and/or one or more application programs or services for implementing the features disclosed herein including an activity module 854. In some examples, the activity module 854 may be configured to manage communications between the different user devices that are sharing updatable graphical fitness user interface elements. The activity module 854 may also manage the actual sharing of the updatable graphical fitness user interface elements between user devices. For example, the activity module 854 may be configured to access a share table stored in the additional storage 846 to update entries in the share table and access data stored in association with the share table. For example, the additional storage 846 may include a storage area for each user that shares an updatable graphical fitness user interface element that includes a version of the user's updatable graphical fitness user interface element. Users who desire to receive activity updates relating to an updatable graphical fitness user interface element of a particular user may subscribe to the storage area corresponding to the particular user. When activity updates are received by the activity module 854, the activity module 854 may sync those updates to the version of the updatable graphical fitness user interface element in the storage area and send notifications of the updates (including the information describing the updates) to the subscribed users.

Figure 9:
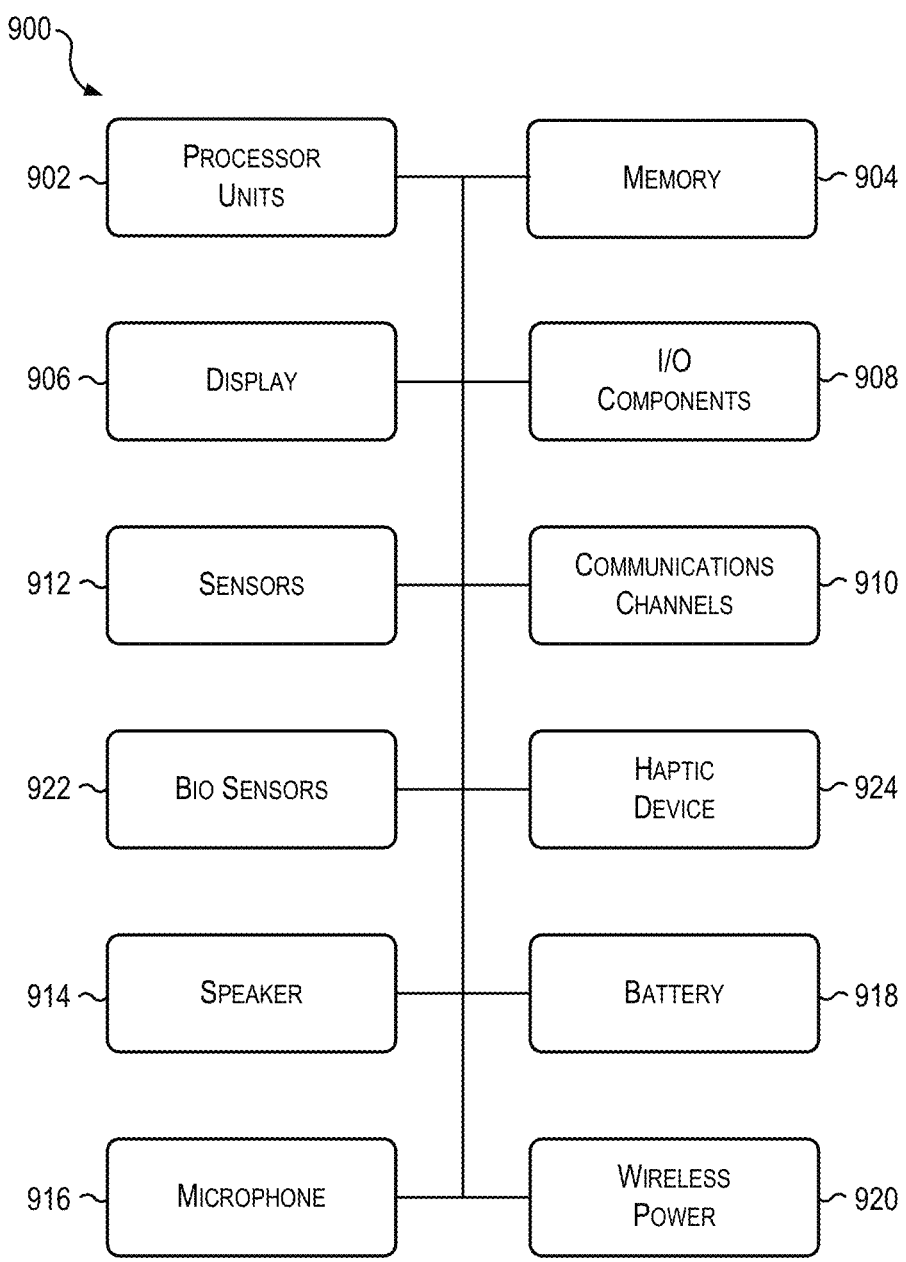
FIG. 9 illustrates a simplified block diagram including components of an example electronic device for sharing updatable graphical fitness user interface elements as described herein, according to at least one example.

FIG. 9 depicts an example schematic diagram of a wearable electronic device 900. The wearable electronic device 900 is an example of the wearable devices 102 and 114. As shown in FIG. 9, the device 900 includes one or more processing units 902 that are configured to access a memory 904 having instructions stored thereon. The instructions or computer programs may be configured to perform one or more of the operations or functions described with respect to the device 900. For example, the instructions may be configured to control or coordinate the operation of the various components of the device. Such components include, but are not limited to, display 906, one or more input/output components 908, one or more communication channels 910, one or more sensors 912, a speaker 914, microphone 916, a battery 918, wireless power 920, bio sensors 922, and/or one or more haptic feedback devices 924. In some embodiments the speaker and microphone may be combined into a single unit and/or may share a common port through a housing of the device.

The processing units 902 of FIG. 9 may be implemented as any electronic device capable of processing, receiving, or transmitting data or instructions. For example, the processing units 902 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some embodiments, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such embodiments the band may include electrical interconnections that permit the two devices to transmit signals to one another and thereby interact with one another.

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

The device also may comprise one or more touch sensors to determine a location of a touch on the cover glass. A touch sensor may be incorporated into or on the display stack in order to determine a location of a touch. The touch sensor may be self-capacitive in certain embodiments, mutual-capacitive in others, or a combination thereof.

Similarly, the device may include a force sensor to determine an amount of force applied to the cover glass. The force sensor may be a capacitive sensor in some embodiments and a strain sensor in other embodiments. In either embodiment, the force sensor is generally transparent and made from transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

The electronic device may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic, and/or visual components of the alert may be synchronized to provide an overall experience to a user. One or more components may be delayed relative to other components to create a desired synchronization among them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output, but at a weak or even subliminal level, thereby priming the wearer to receive the auditory output.

Figure 10:
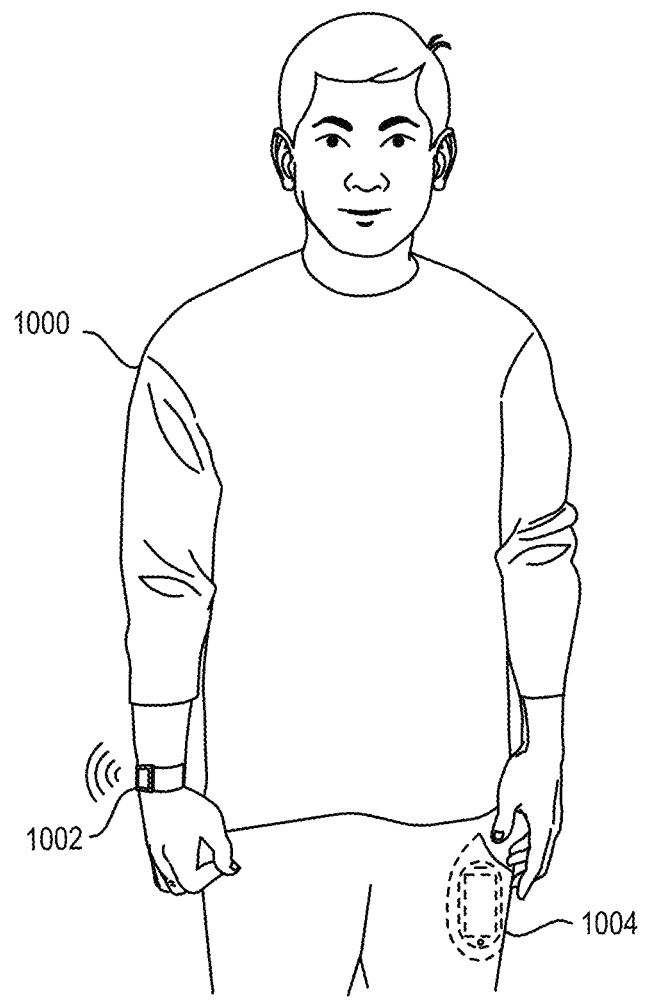
FIG. 10 illustrates a simplified diagram including example electronic devices for sharing updatable graphical fitness user interface elements as described herein, according to at least one example.

The example electronic device may communicate with other electronic devices either through a wired connection or wirelessly. Data may be passed between devices, permitting one device to relay information to another; control another; employ another's sensors, outputs, and/or inputs; and so on. FIG. 10 depicts a user 1000 wearing a first electronic device 1002 with a second electronic device 1004 in his pocket. Data may be wirelessly transmitted between the electronic devices 1002, 1004, thereby permitting the user 1000 to receive, view, and interact with data from the second device 1004 by means of the first electronic device 1002. Thus, the user 1000 may have access to part or all of the second device's functionality through the first electronic device 1002 without actually needing to interact directly with the second device 1004. In some examples, the second electronic device 1004 may be an example of the electronic devices 108, 116.

Further, the electronic devices 1002, 1004 may cooperate not only to share data, but to share functionality as well. For example, one of the two devices may incorporate a sensor, application, or function that the other lacks. The electronic device lacking such capabilities may request them from the other device, which may share wirelessly with the requesting device. Thus, multiple devices may operate together to provide expanded functions, software, access, and the like between the two and ultimately to a user. As one non-limiting example, the electronic device 1002 may be unable to place or receive telephone calls while the second device 1004 may be able to do so. A user may nonetheless make and/or receive calls through the first device 1002, which may employ the second device 1004 to actually place or accept a call.

As another non-limiting example, an electronic device 1002 may wirelessly communicate with a sales terminal nearby, thus permitting a user to quickly and efficiently conduct a transaction such as selling, buying, or returning a good. The electronic device may use near field communications technology to perform these and other functions.

As mentioned above, a band may be connected to two electronic devices and may serve as a wired communication path between the two. As another example, the devices may communicate wirelessly, thereby permitting one device to relay information from a second to a user. This latter example may be particularly useful when the second is inaccessible.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. Also include blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric data may be used, in part, to determine the historic, current, and/or predicted activity data of the user.

Certain embodiments may be wirelessly charged. For example, an inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes.

In certain embodiments, the device may include a rotary input, which may take the form of a crown with a stem. The crown and stem may be rotated to provide the rotary input. Rotation of the stem and/or crown may be sensed optically, electrically, magnetically, or mechanically. Further, in some embodiments the crown and stem may also move laterally, thereby providing a second type of input to the device.

The electronic device may likewise include one or more buttons. The button(s) may be depressed to provide yet another input to the device. In various embodiments, the button may be a dome switch, rocker switch, electrical contact, magnetic switch, and so on. In some embodiments the button may be waterproof or otherwise sealed against the environment.

Various embodiments may include or otherwise incorporate one or more motion sensors. A motion sensor may detect motion of the device and provide, modify, cease, or otherwise affect a state, output, or input of the device or associated applications based on the motion. As non-limiting examples, a motion may be used to silence the device or acknowledge an alert generated by the device. Sample motion sensors include accelerometers, gyroscopic sensors, magnetometers, GPS sensors, distance sensors, and so on. Some embodiments may use a GPS sensor to facilitate or enable location and/or navigation assistance.

As shown in FIG. 9, the device 900 may also include one or more acoustic elements, including a speaker 914 and/or a microphone 916. The speaker 914 may include drive electronics or circuitry and may be configured to produce an audible sound or acoustic signal in response to a command or input. Similarly, the microphone 916 may also include drive electronics or circuitry and is configured to receive an audible sound or acoustic signal in response to a command or input. The speaker 914 and the microphone 916 may be acoustically coupled to port or opening in the case that allows acoustic energy to pass, but may prevent the ingress of liquid and other debris.

Certain embodiments may incorporate an ambient light sensor. The ambient light sensor may permit the device to sense a brightness of its environment and adjust certain operational parameters accordingly. For example, the electronic device may modify a brightness of a display in response to the sensed ambient light. As another example, the electronic device may turn the display off if little or no light is sensed for a period of time.

These and other functions, operations, and abilities of the electronic device will be apparent upon reading the specification in its entirety.

Certain embodiments of a wearable electronic device may include one or more sensors that can be used to calculate a health metric or other health-related information. As one example, a wearable electronic device may function as a wearable health assistant that provides health-related information (whether real-time or not) to the user, authorized third parties, and/or an associated monitoring device.

Figure 11:
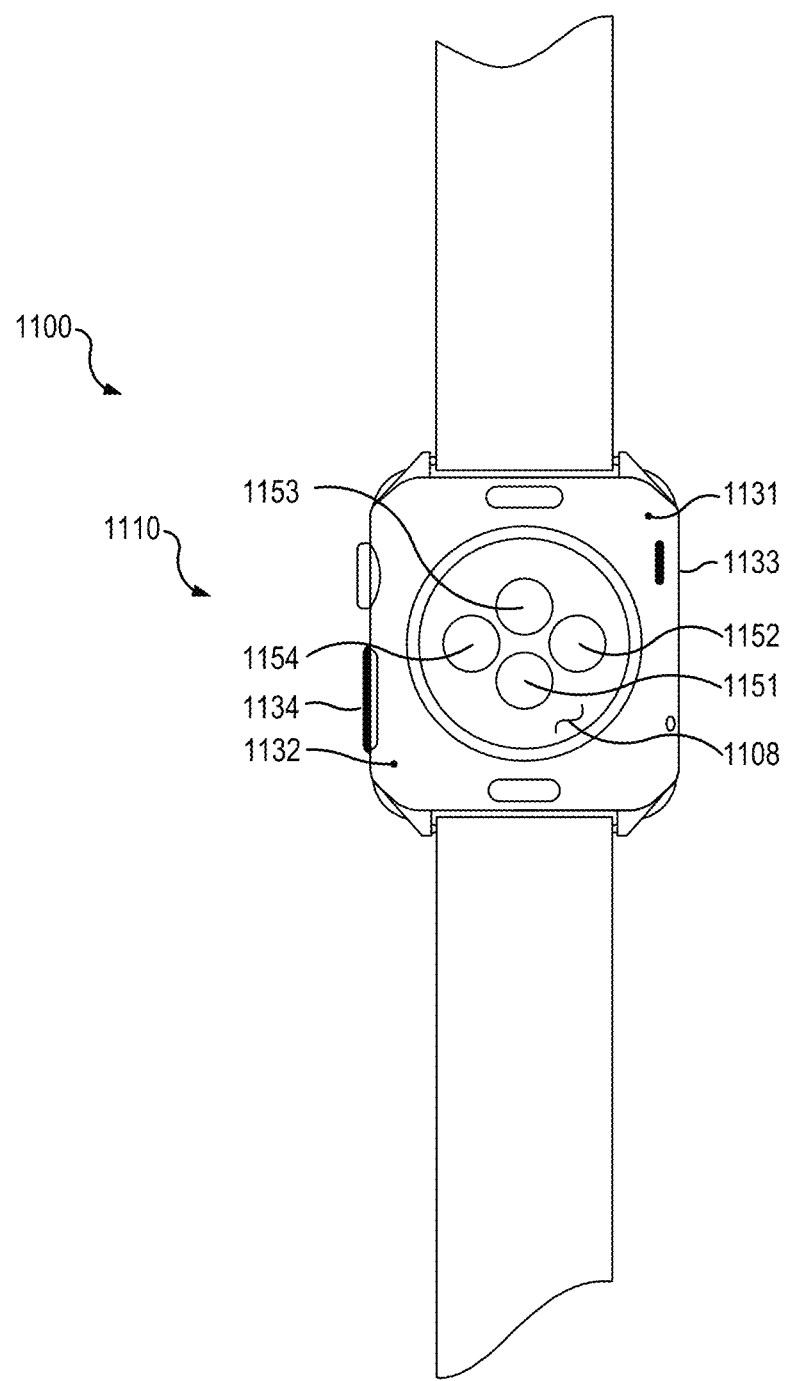
FIG. 11 illustrates an electronic device for sharing updatable graphical fitness user interface elements as described herein, according to at least one example.

FIG. 11 depicts an example electronic device 1100 having one or more biometric sensors. The electronic device 1100 is an example of the wearable devices 102, 114. As shown in FIG. 11, an array of light sources and a photodetector 1151-1154 may be disposed on the rear surface of the device 1100. In one example, the light sources 1151-1153 are formed from light emitting diode (LED) elements that are configured to emit light into a portion of the wearer's body (e.g., wrist). The photodetector 1154 is shared between the multiple light sources 1151-1153 and is configured to receive light reflected from the body. The photodetector may be formed from a photodiode material that is configured to produce a signal based on the received light. In one implementation, the signal produced by the photodetector 1154 is used to compute a health metric associated with the wearer. In some cases, the light sources 1151-1153 and the photodetector 1154 form a photoplethysmography (PPG) sensor. The first light source 1151 may include, for example, a green LED, which may be adapted for detecting blood perfusion in the body of the wearer. The second light source 1152 may include, for example, an infrared LED, which may be adapted to detect changes in water content or other properties of the body. The third 1153 light source may be a similar type or different types of LED element, depending on the sensing configuration. The optical (e.g., PPG) sensor or sensors may be used to compute various health metrics, including, without limitation, a heart rate, a respiration rate, blood oxygenation level, a blood volume estimate, blood pressure, or a combination thereof. One or more of the light sources 1151-1153 and the photodetector 1154 may also be used for optical data transfer with a base or other device. While FIG. 11 depicts one example embodiment, the number of light sources and/or photodetectors may vary in different embodiments. For example, another embodiment may use more than one photodetector. Another embodiment may also use fewer or more light sources than are depicted in the example of FIG. 11.

Also as shown in FIG. 11, the device 1100 includes multiple electrodes 1131, 1132, 1133, 1134 that are located on or near external surfaces of the device 1100. In the present example, the device 1100 includes a first electrode 1131 and a second electrode 1132 that are located on or proximate to a rear-facing surface of the device body 1110. In this example, the first electrode 1131 and the second electrode 1132 are configured to make electrical contact with the skin of the user wearing the device 1100. In some cases, the first 1131 and second 1132 electrodes are used to take an electrical measurement or receive an electrical signal from the body of the user. As also shown in FIG. 11, the device 1100 may include a third electrode 1133 and a fourth electrode 1134 that are located on or proximate to a perimeter of the case 1101 of the device body 1110. In the present example, the third 1133 and fourth 1134 electrodes are configured to be contacted by one or more fingers of the user who is wearing or interacting with the device 1100. In some cases, the third 1133 and fourth 1134 electrodes are also used to take an electrical measurement or receive an electrical signal from the body of the user. In some cases, the first 1131, second 1132, third 1133, and fourth 1134 electrodes are all used to take a measurement or series of measurements that can be used to compute another health metric of the user's body. Health metrics that may be computed using the electrodes include, without limitation, heart functions (ECG, EKG), water content, body-fat ratios, galvanic skin resistance, and combinations thereof.

In the configuration depicted in FIG. 11, the electronic device 1100 includes one or more apertures in the case 1110. A light source 1151-1155 may be disposed in each aperture. In one embodiment, each light source 1151-1153 is implemented as a light-emitting diode (LED). In the present example, the four apertures, three light sources 1151-1153, and a single detector 1155 are used to form one or more sensors. Other embodiments can include any number of light sources. For example, two light sources can be used in some embodiments.

The light sources may operate at the same light wavelength range, or the light sources can operate at different light wavelength ranges. As one example, with two light sources one light source may transmit light in the visible wavelength range while the other light source can emit light in the infrared wavelength range. With four light sources, two light sources may transmit light in the visible wavelength range while the other two light sources can emit light in the infrared wavelength range. For example, in one embodiment, at least one light source can emit light in the wavelength range associated with the color green while another light source transmits light in the infrared wavelength range. When a physiological parameter of the user is to be determined, the light sources emit light toward the user's skin and the optical sensor senses an amount of reflected light. In some cases, a modulation pattern or sequence may be used to turn the light sources on and off and sample or sense the reflected light.

Illustrative methods and systems for managing user device connections are described above. Some or all of these systems and methods may, but need not, be implemented at least partially by architectures such as those shown at least in FIGS. 1-11 above. While many of the embodiments are described above with reference to personal, activity, and/or health-related information, it should be understood that any type of user information or non-user information (e.g., data of any type) may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   receiving, at a first device, a first communication from a second device that comprises a request to share, with the second device, user interface element data corresponding to an updatable graphical fitness user interface element associated with a user account of the first device, the updatable graphical fitness user interface element representing sensor data collected at the first device, wherein the first communication is initiated responsive to an initial input with respect to a first user interface element of a first user interface of the second device, and the first user interface element identifying the user account of the first device;
in response to receiving the first communication at the first device, providing a second user interface for presentation at the first device;
receiving, via the second user interface, a subsequent input with respect to a second user interface element of the second user interface, the subsequent input comprising an acceptance of the request to share the user interface element data corresponding to the updatable graphical fitness user interface element associated with the user account of the first device, the subsequent input comprising at least one of:
accepting the request to share the user interface element data corresponding the updatable graphical fitness user interface element associated with the user account of the first device for a predetermined period of time; or
accepting the request to share the user interface element data corresponding the updatable graphical fitness user interface element associated with the user account of the first device for an indefinite period of time;
and
after receiving the subsequent input, providing the user interface element data corresponding to the updatable graphical fitness user interface element for presentation of the updatable graphical fitness user interface element at the second device, the updatable graphical fitness user interface element comprising a plurality of concentric rings that are updated based at least in part on one or more fitness activities performed by a user associated with the user account of the first device, each concentric ring associated with at least one of the one or more fitness activities.

2. The computer-implemented method of claim 1, further comprising providing to the second device a second communication that comprises a second request to share, with the first device, second user interface element data corresponding a second updatable graphical fitness user interface element associated with a second user account of the second device.

3. The computer-implemented method of claim 1, wherein providing the user interface element data corresponding to the updatable graphical fitness user interface element comprises providing the user interface element data corresponding to the updatable graphical fitness user interface element without providing the sensor data.

4. The computer-implemented method of claim 1, wherein the first user device is a first handheld user device or a wearable device and the second user device is a second handheld user device.

5. A computer-implemented method comprising:
receiving, at a first device, a first communication from a second device that comprises a first request to share, with the second device, first user interface element data corresponding to a first updatable graphical fitness user interface element associated with a user account of the first device, the first updatable graphical fitness user interface element representing first sensor data collected at the first device, wherein the first communication is initiated responsive to an initial input with respect to a first user interface element of a first user interface of the second device, the first user interface element identifying the user account of the first device;
in response to receiving the first communication at the first device, providing a second user interface for presentation at the first device;
receiving, via the second user interface, a subsequent input with respect to a second user interface element of the second user interface, the subsequent input comprising an acceptance of the first request to share the first user interface element data corresponding to the first updatable graphical fitness user interface element, the subsequent input indicating at least one of:
acceptance of the first request to share the first user interface element data corresponding to the first updatable graphical fitness user interface element by sending, to the second device, a second request to share second user interface element data corresponding to a second updatable graphical fitness user interface element for a period of time;
or
rejection of the first request to share the first user interface element data corresponding to the first updatable graphical fitness user interface element by sending a rejection acknowledgement; and
when the subsequent input indicates acceptance of the first request, providing the first user interface element data corresponding to the first updatable graphical fitness user interface element for presentation of the first updatable graphical fitness user interface element at the second device, the first updatable graphical fitness user interface element comprising a plurality of concentric rings that are updated based at least in part on one or more fitness activities performed by a user associated with the user account of the first device, each concentric ring associated with at least one of the one or more fitness activities.

6. The computer-implemented method of claim 5, further comprising, after sending, to the second device, the second request to share the second user interface element data corresponding to the second updatable graphical fitness user interface element, receiving the second user interface element data corresponding to the second updatable graphical fitness user interface element from the second device.

7. The computer-implemented method of claim 5, wherein the period of time comprises one of:
a predetermined period of time;
an indefinite period of time; or
a user-specified period of time.

8. The computer-implemented method of claim 5, wherein providing the first user interface element data corresponding to the first updatable graphical fitness user interface element for presentation of the first updatable graphical fitness user interface element at the second device comprises:
providing a first version of the first user interface element data corresponding to the first updatable graphical fitness user interface element at a first time; and
providing a second version of the first user interface element data corresponding to the first updatable graphical fitness user interface element at a second time, the second version updated based at least in part on the one or more fitness activities performed by the user associated with the user account of the first device, at least a portion of the one or more fitness activities being performed by the user between the first time and the second time.

9. The computer-implemented method of claim 5, further comprising providing for presentation, at the second device, a first user identifier associated with a first user of the first device when the subsequent input indicates acceptance of the first request to share the first user interface element data corresponding to the first updatable graphical fitness user interface element.

10. The computer-implemented method of claim 9, further comprising providing for presentation, at the second device, a third updatable graphical fitness user interface element and a second user identifier associated with a second user of a third device together with the first updatable graphical fitness user interface element and the first user identifier, the third updatable graphical fitness user interface element associated with the third device.

11. The computer-implemented method of claim 10, wherein providing for presentation, at the second device, the third updatable graphical fitness user interface element together with the first updatable graphical fitness user interface element comprises providing for presentation, at the second device, the third updatable graphical fitness user interface element together with the first updatable graphical fitness user interface element in a list ranked according to a ranking dimension, the ranking dimension comprising at least one of an alphabetical dimension or an activity dimension.

12. The computer-implemented method of claim 9, wherein the first user identifier comprises a first user name of the first user, and wherein providing for presentation, at the second device, the first user identifier comprises providing for presentation, at the second device:
the first updatable graphical fitness user interface element;
the first user name; and
a first user image associated with the first user.

13. The computer-implemented method of claim 9, further comprising providing a detailed activity view corresponding to the first updatable graphical fitness user interface element for presentation at the second device, the detailed activity view comprising additional activity data associated with the first user.

14. A computer-implemented method comprising:
displaying, at a first user device and based at least in part on a contact list associated with the first user device, a set of users, each user of the set of users associated with one user device capable of receiving data for at least one updatable graphical fitness user interface element;
receiving a first input at a first user interface element of a first user interface of the first user device, the first input indicating selection of a first user from the set of users, the first user associated with a second user device;
receiving, at the second user device, a first communication from the first user device that comprises a request to share, with the first user device, user interface element data corresponding to an updatable graphical fitness user interface element associated with the first user's account of the second user device, the updatable graphical fitness user interface element representing sensor data collected at the second user device;
in response to receiving the first communication at the second user device, providing a second user interface for presentation at the second user device;
receiving, via the second user interface, a second input with respect to a second user interface element of the second user interface, the second input comprising an acceptance of the request to share the user interface element data corresponding to the updatable graphical fitness user interface element associated with the first user's account of the second user device, the second input comprising at least one of:
accepting the request to share the user interface element data corresponding the updatable graphical fitness user interface element associated with the first user's account of the second user device for a predetermined period of time; or
accepting the request to share the user interface element data corresponding the updatable graphical fitness user interface element associated with the first user's account of the second user device for an indefinite period of time; and
after receiving the second input, providing the user interface element data corresponding to the updatable graphical fitness user interface element for presentation of the updatable graphical fitness user interface element at the first user device, the updatable graphical fitness user interface element comprising a plurality of concentric rings that are updated based at least in part on one or more fitness activities performed by the first user associated with the first user's account of the second user device, each concentric ring associated with at least one of the one or more fitness activities.

15. The computer-implemented method of claim 14, further comprising:
receiving a third input, at the first user device, indicating selection of the first user from a set of activity friends; and
in response to receiving the third input at the first user device, sending a different communication to the second user device indicating termination of sharing of the updatable graphical fitness user interface element with the first user device.

* * * * *